United States Patent
Konishi et al.

(10) Patent No.: US 11,104,427 B2
(45) Date of Patent: Aug. 31, 2021

(54) UNMANNED AIR VEHICLE

(71) Applicant: Panasonic Intellectual Property Corporation of America, Torrance, CA (US)

(72) Inventors: Kazunobu Konishi, Osaka (JP); Stephen John, Nara (JP); Ko Mizuno, Osaka (JP); Takeo Kanamori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 395 days.

(21) Appl. No.: 16/044,532

(22) Filed: Jul. 25, 2018

(65) Prior Publication Data

US 2019/0039724 A1    Feb. 7, 2019

Related U.S. Application Data

(60) Provisional application No. 62/539,828, filed on Aug. 1, 2017.

(30) Foreign Application Priority Data

Mar. 23, 2018  (JP) .............................. JP2018-057310

(51) Int. Cl.
*B64C 27/00* (2006.01)
*B64C 27/52* (2006.01)
(Continued)

(52) U.S. Cl.
CPC ............ *B64C 27/001* (2013.01); *B64C 27/52* (2013.01); *B64C 39/024* (2013.01);
(Continued)

(58) Field of Classification Search
CPC ..... B64C 27/00; B64C 27/001; B64C 27/002; B64C 27/52; B64C 39/024; G10K 11/1782; H04R 1/406
See application file for complete search history.

(56) References Cited

U.S. PATENT DOCUMENTS 4,689,821 A * 8/1987 Salikuddin ....... G10K 11/17857
  381/71.9
9,489,937 B1 * 11/2016 Beard ................ G10L 21/0216
(Continued)

FOREIGN PATENT DOCUMENTS

JP        2017-009965         1/2017

*Primary Examiner* — Michael H Wang
(74) *Attorney, Agent, or Firm* — Greenblum & Bernstein. P.L.C.

(57) ABSTRACT

An unmanned air vehicle is provided. The unmanned air vehicle includes one or more generators, each of which generates a force that drives the unmanned air vehicle to fly and also generates an airflow. Each of one or more first microphones is located in an external region that is not included in any of one or more first airflow regions. Each of the one or more first airflow regions corresponds to the airflow generated by one of the one or more generators. Each of one or more second microphones is located in the external region between at least one of the one or more generators and the one or more first microphones. A processor performs processing on one or more first signals output from the one or more first microphones and one or more second signals output from the one or more second microphones.

18 Claims, 12 Drawing Sheets

(51) Int. Cl.
  *B64C 39/02* (2006.01)
  *H04R 1/40* (2006.01)
  *G10K 11/178* (2006.01)
  *H04R 1/02* (2006.01)
  *H04R 3/00* (2006.01)

(52) U.S. Cl.
  CPC ....... *G10K 11/17823* (2018.01); *H04R 1/406* (2013.01); *B64C 2201/024* (2013.01); *B64C 2201/108* (2013.01); *B64C 2220/00* (2013.01); *G10K 2210/1281* (2013.01); *G10K 2210/3044* (2013.01); *G10K 2210/3046* (2013.01); *H04R 1/025* (2013.01); *H04R 3/005* (2013.01); *H04R 2201/025* (2013.01); *H04R 2410/05* (2013.01); *H04R 2410/07* (2013.01); *H04R 2499/13* (2013.01)

(56) References Cited

U.S. PATENT DOCUMENTS

| | | | |
|---|---|---|---|
| 2004/0066940 A1* | 4/2004 | Amir | G10K 11/17881 381/94.2 |
| 2013/0105635 A1* | 5/2013 | Alzu'bi | B64C 39/024 244/23 A |
| 2016/0063987 A1* | 3/2016 | Xu | B64C 39/024 381/71.12 |
| 2016/0379619 A1* | 12/2016 | Sugaya | G10K 11/17875 381/71.2 |
| 2017/0121034 A1* | 5/2017 | Fisher | H04N 5/23267 |
| 2018/0286372 A1* | 10/2018 | Beckman | G05D 27/02 |
| 2019/0106204 A1* | 4/2019 | Konishi | B64C 39/024 |
| 2019/0130889 A1* | 5/2019 | Matus, Jr. | G10K 11/178 |
| 2019/0237059 A1* | 8/2019 | Cantrell | G10K 11/175 |
| 2019/0291856 A1* | 9/2019 | Kaufman | B64C 27/08 |

* cited by examiner

UNMANNED AIR VEHICLE

BACKGROUND

1. Technical Field

The present disclosure relates to an unmanned air vehicle.

2. Description of the Related Art

Regarding an unmanned air vehicle, Japanese Unexamined Patent Application Publication No. 2017-9965 discloses a wireless airplane having a capability of reducing a noise while maintaining a flying performance. More specifically, in the wireless airplane disclosed in Japanese Unexamined Patent Application Publication No. 2017-9965, a propeller is rotated by a motor to allow the wireless airplane to fly in the air. In this wireless airplane, a rotation sound of the motor is sensed, an acoustic wave is generated such that the acoustic wave has a phase opposite to that of the sensed rotation sound, an ambient sound is sensed, and the sensed ambient sound is mixed with the acoustic wave having the phase opposite to the phase of the sensed rotation sound, thereby cancelling a noise.

SUMMARY

In a case where a microphone is disposed close to a propeller, an airflow generated by the propeller may hit the microphone, which may cause a wind noise to occur and to be input to the microphone. This may make it difficult to properly detect a noise generated by the propeller, and thus, it becomes difficult to remove the noise generated by the propeller from a target sound.

One non-limiting and exemplary embodiment provides an unmanned air vehicle capable of suppressing a wind noise from being input to a microphone.

In one general aspect, the techniques disclosed herein feature an unmanned air vehicle including: one or more generators, each of which generates a force that drives the unmanned air vehicle to fly and also generates an airflow; one or more first microphones, each of which is located in an external region that is not included in any of one or more first airflow regions, each of the one or more first airflow regions corresponding to the airflow generated by one of the one or more generators; one or more second microphones, each of which is located in the external region between at least one of the one or more generators and the one or more first microphones; and a processor that performs processing on one or more first signals output from the one or more first microphones and one or more second signals output from the one or more second microphones.

According to the aspect of the present disclosure, it is possible to suppress wind noise from being input to the microphone.

General or specific embodiments may be implemented by an apparatus, a system, a method, an integrated circuit, a computer program, a computer-readable storage medium such as a CD-ROM, or any selective combination of an apparatus, a system, a method, an integrated circuit, a computer program, and a storage medium.

DETAILED DESCRIPTION

Figure 1:
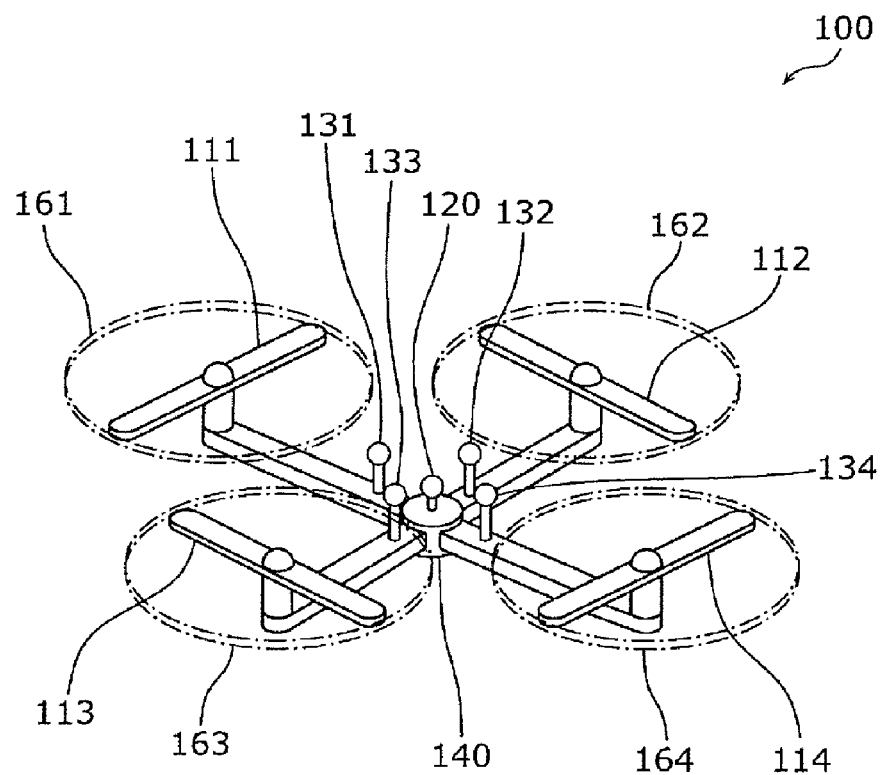
FIG. 1 is an external view illustrating a structure of an unmanned air vehicle according to an embodiment.

Underlying Knowledge Forming Basis of the Present Disclosure

In recent years, drones or unmanned air vehicles which are also called unmanned aircrafts or Unmanned Aerial Vehicles (UAVs) have been begun to be used in collecting information or other applications. For example, by moving an unmanned air vehicle with a sensor disposed thereon to a place difficult for human beings to get to, it becomes possible to acquire various kinds of information about the place via the sensor. This may also be applied to other applications such as a diagnosis of a building. For example, the unmanned air vehicle configured in the above-described manner may be used to sense an ambient sound around the unmanned air vehicle.

However, the unmanned air vehicle basically generates a loud noise, and thus it is not easy to sense an ambient sound around the unmanned air vehicle without sensing the noise generated by the unmanned air vehicle. To handle the above-described situation, for example, a technique may be employed to sense both the ambient sound around the unmanned air vehicle and the noise generated by the unmanned air vehicle and remove the noise from the ambient sound. This technique makes it possible to clearly obtain a desired ambient sound around the airframe by removing the sound sensed as the noise from the sound sensed as the ambient sound around the unmanned air vehicle.

More specifically, to remove a noise from a sound, noise cancelling (NC) may be employed. The noise cancelling is a technique to suppress a noise or the like by actively adding an opposite-phase sound or to remove only a noise component from a sound. For example, a sound and a noise are sensed, and then, if the sound and the opposite-phase noise mixed together, the noise can be removed from the sound. The opposite-phase sound of the original sound is a sound that is opposite in phase to the original sound and that has a waveform resulting from inverting the waveform of the original sound.

To apply the noise cancelling, a microphone for sensing a noise is disposed close to a noise source. For example, a noise is generated by a propeller of an unmanned air vehicle. More specifically, when the propeller rotates, one blade of the propeller generates a blade tip vortex. When this blade tip vortex hits another blade of the propeller, noise is generated. A microphone for sensing such a noise is disposed close to the propeller.

However, there is a possibility that a wind generated by the propeller hits the microphone and as a result, a wind noise is sensed by the microphone. That is, there is a possibility that a noise other than the noise to be cancelled by the noise cancelling is input to the microphone. In this case, there is a possibility that the noise generated by the propeller is not properly sensed. If the noise is not correctly sensed, it can be difficult to properly remove the noise from the ambient sound around the unmanned air vehicle.

In view of the above, according to an aspect of the present disclosure, an unmanned air vehicle includes: one or more generators, each of which generates a force that drives the unmanned air vehicle to fly and also generates an airflow; one or more first microphones, each of which is located in an external region that is not included in any of one or more first airflow regions, each of the one or more first airflow regions corresponding to the airflow generated by one of the one or more generators; one or more second microphones, each of which is located in the external region between at least one of the one or more generators and the one or more first microphones; and a processor that performs processing on one or more first signals output from the one or more first microphones and one or more second signals output from the one or more second microphones.

The configuration described above makes it possible for the unmanned air vehicle to suppress a wind noise from being input to the one or more first microphones for sensing the ambient sound around the unmanned air vehicle and the one or more second microphones for sensing noise. The generators, each of which generates a force that drives the unmanned air vehicle and also generates an airflow, are likely to generate a noise. The unmanned air vehicle is capable of properly sensing the noise, which may be generated by the generator and which may be input to the first microphone, by using the second microphone located between the first microphone and the generator.

For example, the one or more generators may include two or more generators, the one or more second microphones may include two or more second microphones, and each of the two or more second microphones may be located, in the external region, between at least one of the one or more first microphones and one of the two or more generators, each of the two or more generators corresponding to one of the two or more second microphones.

By employing the configuration described above, it becomes possible for the unmanned air vehicle to generate, by using the plurality of generators, a force that drives the unmanned air vehicle to fly. The unmanned air vehicle includes the second microphone for sensing the noise generated by each generator, and thus, the unmanned air vehicle is capable of properly sensing the noise associated with each generator.

For example, the one or more first microphones may include one first microphone, and each of the two or more second microphones may be located, in the external region, between the one first microphone and one of the two or more generators.

This configuration makes it possible for the unmanned air vehicle to properly sense a noise which may be generated by each generator and which may be input to the first microphone.

For example, directions of airflows generated by the two or more generators may not be parallel and may not cross.

Thus, it is possible for the unmanned air vehicle to have a sufficiently large region in which the first microphone and the second microphones are disposed. Thus, it is possible to dispose the first microphone and the second microphones at proper locations.

For example, the directions of the airflows generated by the two or more generators may allow the unmanned air vehicle to fly.

Thus, it is possible for the unmanned air vehicle to properly fly in a state in which the generators are slanted.

For example, the unmanned air vehicle may further include first actuators that control the directions of the airflows generated by the two or more generators.

Thus, it is possible for the unmanned air vehicle to control the slants of the generators thereby controlling the directions of the airflows generated by the generators. That is, the unmanned air vehicle is capable of adaptively changing the slants of the generators.

For example, the processor may determine a movement of the unmanned air vehicle, and the processor may control operation of the first actuators such that an angle between the directions of the airflows generated by the two or more generators when the unmanned air vehicle moves is reduced.

Thus, it is possible for the unmanned air vehicle to suppress a force from occurring in a direction opposite to the moving direction.

For example, the two or more second microphones may be located in the external region regardless of a change in the directions of the airflows generated by the two or more generators.

Thus, it is possible for the unmanned air vehicle to suppress the wind noise from being input to the second microphone regardless of whether a change occurs in the direction of the airflow.

For example, the unmanned air vehicle may further include second actuators that control respective positions of the two or more second microphones, and the processor may control operation of the second actuators such that, in a case where a change occurs in the directions of the airflows generated by the two or more generators, the two or more second microphones are each located in the external region.

This makes it possible for the unmanned air vehicle to properly position each second microphone adaptively depending on a change in the slant of each generator.

For example, in a case where a change occurs in the directions of the airflows generated by the two or more generators, a relative relationship may be maintained between the first airflow region of each of the two or more generators and a position of each of the two or more second microphones.

This makes it possible for the unmanned air vehicle to maintain each second microphone in a proper position adaptively depending on a change in the slant of each generator.

For example, the processor may control operation of the first actuators such that, during a period in which sound detecting by the one or more first microphone is not performed, an angle between the directions of the airflows generated by the two or more generators is reduced.

This makes it possible for the unmanned air vehicle to slant the generators during the sound sensing period so as to achieve a state that allows it to properly sense the sound. During a period in which sound sensing is not performed, the unmanned air vehicle is capable of achieving a state that allows it to properly move.

For example, the unmanned air vehicle may include a third actuator that controls a sound detecting direction of each of the one or more second microphones, the processor may determine a moving direction of the unmanned air vehicle, and the processor may control operation of the third actuator such that the sound detecting direction of the at least one of the one or more second microphones changes according to a change in the moving direction.

Thus, the unmanned air vehicle is capable of changing the sound sensing direction adaptively depending on a change in the moving direction.

For example, the processor may control operation of the third actuator such that the sound detecting direction of the at least one of the one or more second microphones is different from the moving direction.

This makes it possible for the unmanned air vehicle to suppress a wind noise, which may occur due to a relative movement of the unmanned air vehicle, from being input to each second microphone.

For example, the processor may generate one or more third signals indicating one or more sounds according to the one or more first signals and the one or more second signals.

This makes it possible for the unmanned air vehicle to newly generate a signal indicating a sound according to the signal sensed by the first microphone located relatively far apart from the generator and the signal sensed by the second microphone located relative close to the generator.

For example, each of the one or more third signals indicates a sound resulting from suppressing sound indicated by at least one of the one or more second signals from sound indicated by at least one of the one or more first signals.

This makes it possible for the unmanned air vehicle to newly generate a signal indicating a sound resulting from suppressing a sound indicated by the signal sensed by the second microphone located relatively close to the generator from a sound indicated by the signal sensed by the first microphone located relatively far apart from the generator.

For example, the external region may not be included in any of the one or more first airflow regions and not included in any of one or more second airflow regions, the one or more second airflow regions respectively flowing into the one or more generators.

This makes it possible for the unmanned air vehicle to suppress an airflow flowing toward the generator from hitting the first microphone and the second microphone, which makes it possible to further suppress a wind noise from being input to the first microphone and the second microphone.

For example, each of the one or more generators may include one or more rotary wings.

This makes it possible for the unmanned air vehicle to suppress an airflow generated by a rotary wing from hitting the first microphone and the second microphone. Furthermore, it becomes possible for the unmanned air vehicle to properly sense a noise generated by the rotary wing.

General or specific embodiments may be implemented by an apparatus, a system, a method, an integrated circuit, a computer program, a computer-readable storage medium such as a CD-ROM, or any selective combination of an apparatus, a system, a method, an integrated circuit, a computer program, and a storage medium.

Embodiments are described in further detail below with reference to drawings. Note that any embodiment described below is provided to illustrate a general or specific example. That is, in the following embodiments of the present disclosure, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are optional.

Note that each drawing used in the following description is a schematic diagram, which does not necessarily provide a strict description of locations or sizes of constituent element.

Embodiments

FIG. 1 is an external view illustrating a structure of an unmanned air vehicle according to an embodiment. In FIG. 1, the unmanned air vehicle 100 includes generators 111 to 114, a main microphone (first microphone) 120, sub-microphones (second microphones) 131 to 134, and a housing 140. The unmanned air vehicle 100 may further include an image capturing apparatus.

The generators 111 to 114 each generate a force to drive the unmanned air vehicle 100 to fly. For example, the generators 111 to 114 each are a machine including a power source, an actuator that generates a flying force using a motive power transmitted from the power source, and other structural components, and more specifically, for example, each generator includes a motor, one or more rotary wings, and a duct or a guard that surrounds the one or more rotary wings. More specifically, the generators 111 to 114 individually generate forces. The force to drive the unmanned air vehicle 100 to fly includes a plurality of forces individually generated by the generators 111 to 114. The force that drives the unmanned air vehicle 100 to fly is also referred to as a resultant force obtained as a result of combining all the plurality of forces individually generated by the respective generators 111 to 114. The force generated individually by each of the generators 111 to 114 may be referred to, for example, as a lift that causes the unmanned air vehicle 100 to move in a vertical direction, that is, to move upward or a thrust that causes the unmanned air vehicle 100 to move in a horizontal direction, that is, to move back and forth and left and right.

The generators 111 to 114 each generate an airflow in a direction opposite to the direction of the force generated by each of the generators 111 to 114. The directions of the individually generated forces may be different among the generators 111 to 114, and the directions of the airflows may be different among the generators 111 to 114. Note that the direction of the airflow is defined by a direction in which the airflow is output from the generator. The forces generated individually by the generators 111 to 114 may also be referred to as components of the force that drives the unmanned air vehicle 100 to fly. That is, the generators 111 to 114 each generate a force component, that drives the unmanned air vehicle 100 to fly, in a direction opposite to the direction of the airflow.

The direction of the airflow is a central direction of the airflow from the upstream side to the downstream side. For example, when the unmanned air vehicle 100 is flying, the generators 111 to 114 each generate an upward force acting on the unmanned air vehicle 100 and generate an airflow in a downward direction from the unmanned air vehicle 100. The upward direction does not necessarily need to be just upward, and the downward direction does not necessarily need to be just downward.

More specifically, in a case where in the unmanned air vehicle 100, the generators 111 to 114 each include one or more rotary wings, when each rotary wing rotates, a lift is generated in an upward direction, and an airflow is generated in a downward direction. More specifically, the airflow and the force are generated by each rotary wing in directions, opposite to each other, along a rotation shaft of the rotary wing. The lift generated in the upward direction causes the unmanned air vehicle 100 to move upward. In the unmanned air vehicle 100, when at least one of the rotary wings of the generators 111 to 114 is rotated at a rotation rate different from rotation rates of the rotary wings of the other generators, a thrust is generated in one of horizontal directions such as a forward, backward, leftward, or rightward direction, and a noise is generated by each rotary wing.

The generators 111 to 114 may also be referred to as force generators, airflow generators, or propellers.

The main microphone 120 is an apparatus that acquires a sound, converts the acquired sound to a signal, and outputs the signal. That is, the main microphone 120 senses a sound and output a signal representing the sensed sound. The main microphone 120 may also be referred to as a first microphone or a sound acquisition microphone.

The sub-microphones 131 to 134 each are an apparatus that acquires a sound, converts the acquired sound to a signal, and outputs the signal. That is, the sub-microphones 131 to 134 each sense a sound and output a signal representing the sensed sound. Each of the sub-microphones 131 to 134 may also be referred to as a second microphone or a noise acquisition microphone. The sub-microphones 131 to 134 respectively correspond to the generators 111 to 114. That is, the sub-microphones 131 to 134 are each assigned to at least one of the generators 111 to 114.

More specifically, the sub-microphone 131 corresponds to the generator 111, the sub-microphone 132 corresponds to the generator 112, the sub-microphone 133 corresponds to the generator 113, and the sub-microphone 134 corresponds to the generator 114. The sub-microphone 131 is disposed so as to correspond to the generator 111, the sub-microphone 132 is disposed so as to correspond to the generator 112, the sub-microphone 133 is disposed so as to correspond to the generator 113, and the sub-microphone 134 is disposed so as to correspond to the generator 114.

More specifically, the sub-microphone 131 is located between the generator 111 and the main microphone 120. Note that the location of the sub-microphone 131 between the generator 111 and the main microphone 120 does not necessarily need to be the exact middle between the locations of the generator 111 and the location of the main microphone 120. For example, the sub-microphone 131 may be located such that the distance between the generator 111 and the sub-microphone 131 is smaller than the distance between the generator 111 and the main microphone 120, and the distance between the sub-microphone 131 and the main microphone 120 is smaller than the distance between the generator 111 and the main microphone 120.

Similarly, the sub-microphone 132 is located between the generator 112 and the main microphone 120, the sub-microphone 133 is located between the generator 113 and the main microphone 120, and the sub-microphone 134 is located between the generator 114 and the main microphone 120.

Basically, each of the sub-microphones 131 to 134 has the same performance as that of the main microphone 120. However, the sub-microphones 131 to 134 may be different in performance from the main microphone 120.

The housing 140 is a structural component for physically accommodating a processor, a memory, and the like. For example, the generators 111 to 114, the main microphone 120, the sub-microphones 131 to 134, and the housing 140 are connected together via one or more support structures and physically supported by the one or more support structures such that relative positions thereof are maintained.

The regions 161 to 164 respectively correspond to the generators 111 to 114. More specifically, the region 161 is a region corresponding to the generator 111, the region 162 is a region corresponding to the generator 112, the region 163 is a region corresponding to the generator 113, and the region 164 is a region corresponding to the generator 114.

More specifically, for example, the region 161 corresponding to the generator 111 is a region defined by a range that can be physically reached by the generator 111. More specifically, in a case where the generator 111 is a rotary wing, the region 161 corresponding to the generator 111 is a range that is reached by the rotary wing when the rotary wing rotates. The regions 162 to 164 are defined in a similar manner.

The unmanned air vehicle 100 may include an energy source such as a power supply for operating various constituent elements, or the unmanned air vehicle 100 may be connected to an external power supply.

Figure 2:
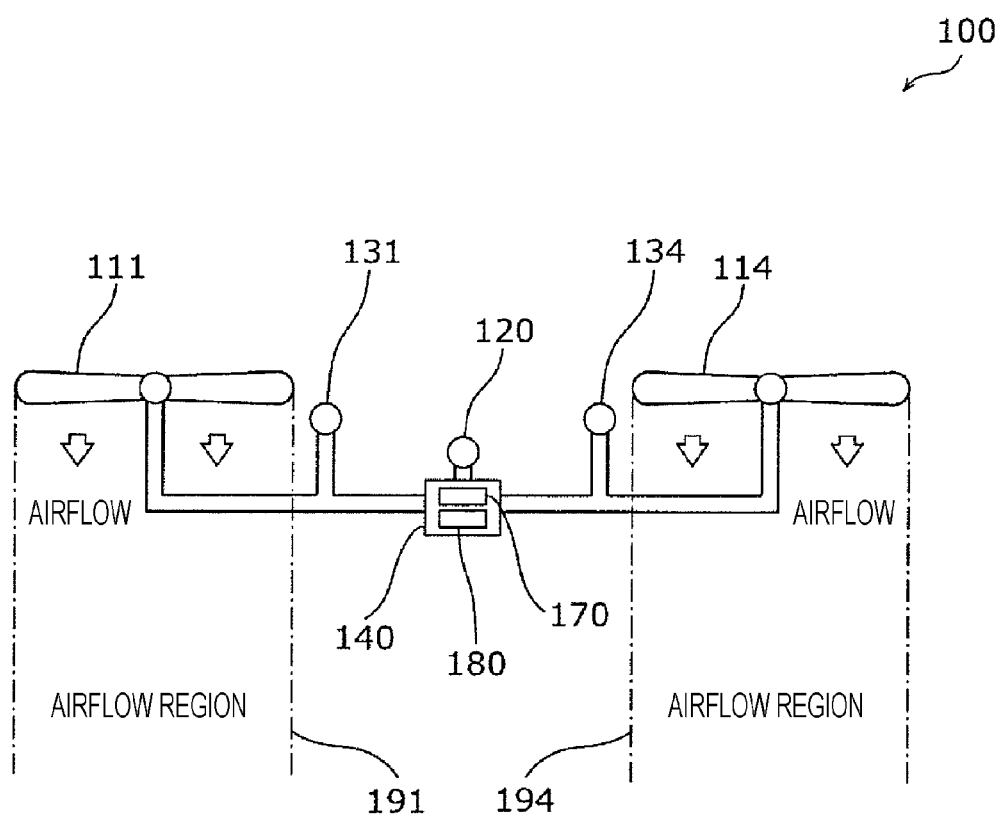
FIG. 2 is a cross-sectional view illustrating a structure of an unmanned air vehicle according to an embodiment.

FIG. 2 is a cross-sectional view illustrating a structure of the unmanned air vehicle 100 illustrated in FIG. 1. More specifically, FIG. 2 conceptually illustrates cross sections taken vertically across the generators 111 and 114 of the unmanned air vehicle 100 illustrated in FIG. 1. Cross sections of the generators 112 and 113 are basically similar to those of the generators 111 and 114 although the cross sections of the generators 112 and 113 are not illustrated.

As illustrated in FIG. 2, a processor 170 and a memory 180 are accommodated in the housing 140. That is, the unmanned air vehicle 100 further includes the processor 170 and the memory 180.

The processor 170 is an electronic circuit that performs information processing. More specifically, a first signal output from the main microphone 120 and second signals output from the respective sub-microphones 131 to 134 are stored in the memory 180. The first signal may also be referred to as a main signal, and each second signal may also be referred to as a sub-signal.

For example, the processor 170 acquires the first signal output from the main microphone 120 and the second signals output from the respective sub-microphones 131 to 134 via wired or wireless communication. A communication line for wired communication may be included in the one or more support structures that support the main microphone 120, the sub-microphones 131 to 134, the housing 140 and the like. The processor 170 inputs the acquired first signal and the acquired second signals to the memory 180 via an input/output circuit thereby storing the first signal and the second signals in the memory 180.

The processor 170 may generate third signals according to the first signal and the second signals. The third signals may also be referred to as to-be-achieved signals. More specifically, the processor 170 may generate a third signal according to the first signal output from the main microphone 120 and the second signal output from the sub-microphone 131. Similarly, the processor 170 may generate third signals according to the first signal output from the main microphone 120 and the second signals output from the respective sub-microphones 132 to 134.

For example, each third signal represents a sound obtained by removing a sound represented by a corresponding one of the second signals from a sound represented by the first signal. The processor 170 may generate a fourth signal representing a sound having a phase opposite to the phase of the sound indicated by the second signal, and may mix the first signal and the fourth signal thereby generating the third signal indicating the sound resulting from mixing the sound indicated by the first signal and the sound opposite in phase to the sound indicated by the second signal. The processor 170 may generate the third signal using another noise cancelling method.

The third signal is not limited to the signal indicating the sound resulting from removing the sound indicated by the second signal from the sound indicated by the first signal. For example, the third signal may indicate a sound resulting from removing the sound indicated by the first signal from the sound indicated by the second signal. That is, the third signal may indicate high-accuracy noise.

When the processor 170 generates the third signals, the processor 170 may temporarily store the first signal and the second signals in the memory 180, and may generate third signals according to the temporarily stored first signal and second signals. The processor 170 may store the third signals generated according to the first signal and the second signals in the memory 180.

The unmanned air vehicle 100 may include a communication apparatus, and the processor 170 may wirelessly communicate with an external apparatus located outside the unmanned air vehicle 100 via the communication apparatus. The processor 170 may receive an operation signal issued to the unmanned air vehicle 100 via the communication apparatus. The processor 170 may control the unmanned air vehicle 100 to fly by operating the generators 111 to 114 and the like according to an operation signal.

The processor 170 may transmits, to an external apparatus, the first signal output from the main microphone 120 and the second signals output from the respective sub-microphones 131 to 134. The processor 170 may transmit the third signals generated according to the first signal and the second signals. For example, when the processor 170 transmits the first signal, the second signals, and the third signals to the external apparatus, the processor 170 may temporarily store the first signal, the second signals, and the third signals in the memory 180, and may transmit the temporarily stored first signal, second signals, and third signals to the external apparatus.

The memory 180 is a medium for storing information. The memory 180 may be a volatile memory or a non-volatile memory. More specifically, the memory 180 may be an optical disk, a magnetic disk, a magnetooptical disk, or a semiconductor memory. The memory 180 stores, for example, the first signal output from the main microphone 120 and the second signals output from the respective sub-microphones 131 to 134.

The airflow regions (first airflow regions) 191 and 194 illustrated in FIG. 2 respectively correspond to the generators 111 and 114. The airflow region 191 is defined as a region through which an airflow generated by the generator 111 (in other words, an airflow passing through the generator 111 or an airflow output from the generator 111) flows. The airflow region 194 is defined as a region through which an airflow generated by the generator 114 flows.

More specifically, the airflow region 191 is a region obtained by extending the region 161 of the generator 111 illustrated in FIG. 1 in the direction of the airflow generated by the generator 111. For example, the airflow region 191 may be a region obtained by infinitely extending the region 161 of the generator 111 or may be a region having a finite size obtained by extending the region 161 such that the length thereof is, for example, 5 times greater than the width of the generator 111 as seen in a direction perpendicular to the direction of the airflow.

Similarly, the airflow region 194 is a region obtained by extending the region 164 of the generator 114 illustrated in FIG. 1 in the direction of the airflow generated by the generator 114. Airflow regions are also defined in a similar manner for the respective generators 112 and 113. Thus, four airflow regions are defined for the respective four generators 111 to 114.

The main microphone 120 and the sub-microphones 131 to 134 are located in an external region outside the whole four airflow regions. More specifically, for example, the main microphone 120 and the sub-microphones 131 to 134 are located in a central region surrounded by the four airflow regions.

By employing the configuration described above, it becomes possible to suppress the airflows generated by the respective generators 111 to 114 from hitting the main microphone 120 and the sub-microphones 131 to 134, which makes it possible to suppress a wind noise from being input to the main microphone 120 and the sub-microphones 131 to 134. Thus, the unmanned air vehicle 100 is capable of properly sensing an ambient sound around the unmanned air vehicle 100 and noises generated by the generators 111 to 114 by using the main microphone 120 and the sub-microphones 131 to 134.

Thus, the unmanned air vehicle 100 is capable of properly sensing a sound and a noise such that a sound including no noise can be obtained by removing the noise from the ambient sound around the unmanned air vehicle 100.

Figure 3:
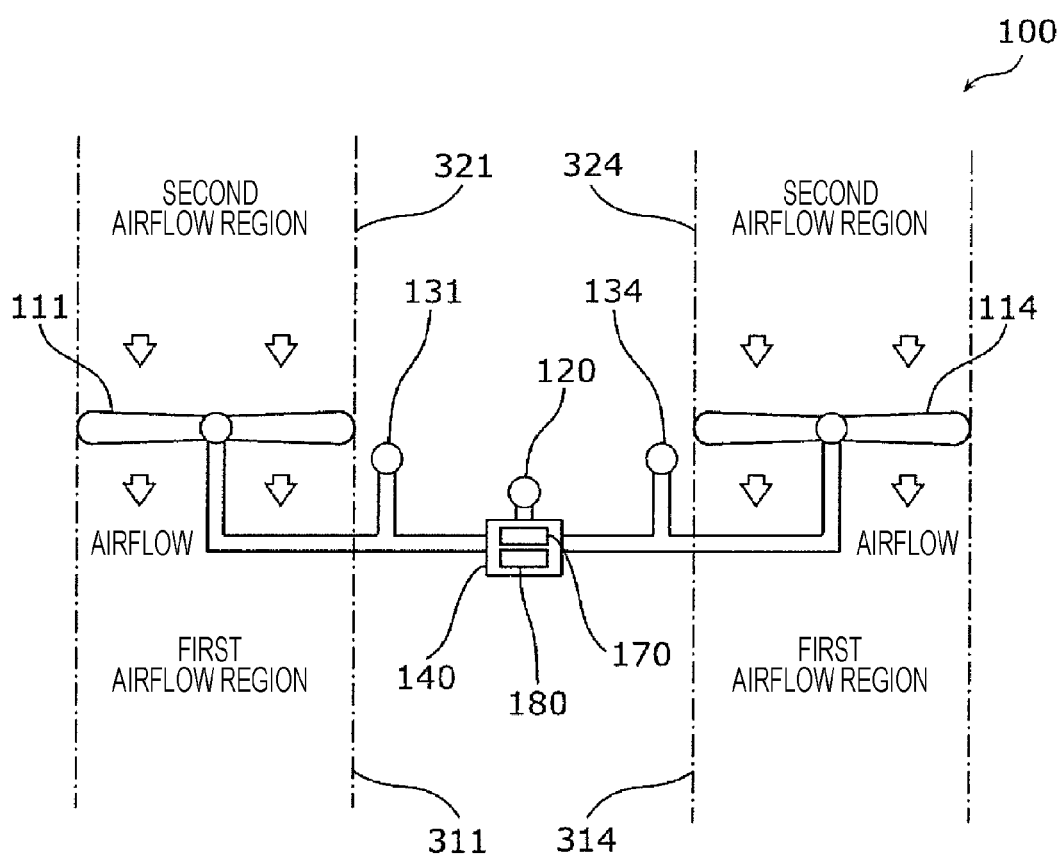
FIG. 3 is a diagram illustrating a modification of airflow regions according to an embodiment.

FIG. 3 is a diagram illustrating a modification of airflow regions of the unmanned air vehicle 100 illustrated in FIG. 1. In the example described above, the airflow regions (the first airflow regions) are defined by the regions into which airflows flow after being generated by the respective generators 111 to 114. Additional airflow regions (second airflow regions) may be defined by regions from which airflows flow into the respective generators 111 to 114. In this case, the main microphone 120 and the sub-microphones 131 to 134 may be located in an external region outside the whole airflow regions (the first airflow regions and the second airflow regions).

More specifically, the first airflow regions 311 and 314 illustrated in FIG. 3 are respectively the same as the airflow regions 191 and 194 illustrated in FIG. 2. First airflow regions are also defined in a similar manner for the respective generators 112 and 113.

Second airflow regions 321 and 324 illustrated in FIG. 3 respectively correspond to the generators 111 and 114. The second airflow region 321 is defined as a part of a region of an airflow generated by the generator 111 and more specifically defined as a region from which an airflow flows into the generator 111. The second airflow region 324 is defined as a part of a region of an airflow generated by the generator 114 and more specifically defined as a region from which an airflow flows into the generator 114.

More specifically, the second airflow region 321 is a region obtained by extending the region 161 of the generator 111 illustrated in FIG. 1 in a direction opposite to the direction of the airflow generated by the generator 111. As with the first airflow region 311, the second airflow region 321 may be a region obtained by infinitely extending the region 161 of the generator 111 or may be a region obtained by finitely extending the region 161.

Similarly, the second airflow region 324 is a region obtained by extending the region 164 of the generator 114 illustrated in FIG. 1 in a direction opposite to the direction of the airflow generated by the generator 114. Second airflow regions are also defined in a similar manner for the respective generators 112 and 113.

Thus, four first airflow regions are defined for the respective four generators 111 to 114, and four second airflow regions are defined for the respective four generators 111 to 114. As with the example illustrated in FIG. 2, the main microphone 120 and the sub-microphones 131 to 134 are located in an external region outside the whole four first airflow regions and the four second airflow regions.

By employing the configuration described above, it becomes possible to suppress the airflows flowing into the respective generators 111 to 114 from hitting the main microphone 120 and the sub-microphones 131 to 134, which makes it possible to suppress a wind noise from being input to the main microphone 120 and the sub-microphones 131 to 134.

The processor 170 and the memory 180 may be accommodated in a constituent element different from the housing 140. For example, the processor 170 and the memory 180 may be disposed in the main microphone 120. The unmanned air vehicle 100 may not include the housing 140.

In the example illustrated in FIG. 3, the main microphone 120 and the sub-microphones 131 to 134 are not disposed in the second airflow region on the upstream side of the airflow. It is likely that the airflow is weak on the upstream side compared with the downstream side. Therefore, the main microphone 120 and the sub-microphones 131 to 134 may be disposed in the second airflow region on the upstream side of the airflow.

In the examples illustrated in the figures, each of the four generators 111 to 114 is realized by one pair of rotary wings having one rotation plane and one rotation shaft. However, one generator may include a plurality of pairs of rotary wings. The plurality of pairs of rotary wings may have different rotation planes different from each other and may have axes different from each other. In the description given above, it is assumed by way of example that the total length of one pair of rotary wings is defined by the diameter of the rotation plane. Alternatively, it may be said that the total length of each individual wing is defined by a radius of the rotation plane and each pair of wings includes two wings.

The rotary wing set includes one or more pairs of wings, and rotating thereof generates a force in a direction along the rotation shaft and generates a stream of an airflow in a direction opposite to the direction of the force. The rotary wing is also called a blade, a rotor, or a propeller. The one or more pairs of rotary wings may also be called a rotary wing set.

Each of the generators 111 to 114 may not be realized by one or more pairs of rotary wings, but each of the generators 111 to 114 may be a jet engine, a rocket engine, or the like.

In the example described above, the unmanned air vehicle 100 includes the four generators 111 to 114. However, the unmanned air vehicle 100 may include three or less generators or may include five or more generators.

Although the unmanned air vehicle 100 includes the four sub-microphones 131 to 134 as the noise acquisition microphones in the examples described above, the unmanned air vehicle 100 may include three or less sub-microphones or may include five or more sub-microphones. The sub-microphones do not necessarily correspond in a one-to-one manner to the generators. In the unmanned air vehicle 100, one sub-microphone may be provided for a plurality of generators, or a plurality of sub-microphones may be provided for one generator.

Although the unmanned air vehicle 100 includes one main microphone 120 as a sound acquisition microphone in the example described above, the unmanned air vehicle 100 may include a plurality of main microphones. For example, in the unmanned air vehicle 100, a plurality of main microphones and a plurality of sub-microphones may be provided such that the main microphones correspond to the respective sub-microphones.

In the example described above, the unmanned air vehicle 100 includes the main microphone 120 and the sub-microphones 131 to 134 disposed at locations above the housing 140. However, in the unmanned air vehicle 100, main microphone 120 and the sub-microphones 131 to 134 may be disposed at locations below the housing 140. Alternatively, in the unmanned air vehicle 100, the main microphone 120 may be disposed at a location below the housing 140, and the sub-microphones 131 to 134 may be disposed at locations above the housing 140. This configuration makes it possible for the unmanned air vehicle 100 to efficiently sense a sound at a side below the housing 140 by the main microphone 120.

The processor 170 may include a plurality of sub-processors. That is, the processor 170 may be realized by the plurality of sub-processors. For example, the processor 170 may be a multiprocessor. The memory 180 may include a plurality of sub-memories. That is, the memory 180 may be realized by a plurality of memories. The memory 180 may be included in the processor 170.

The unmanned air vehicle 100 may include an antenna for use in wireless communication. The unmanned air vehicle 100 may include a wireless communication circuit, or the processor 170 may also operate as a wireless communication circuit for wireless communication.

The unmanned air vehicle 100 may not be symmetric in structure. Similarly, an unmanned air vehicle according to any one of modifications described below does not necessarily need to be symmetric in structure.

Some modifications to the embodiment are described below. In the following description of those modifications, a description of substantially similar elements to those in the embodiment may be omitted.

First Modification

In the embodiment described above, the unmanned air vehicle 100 includes the four generators 111 to 114. In contrast, in a first modification described below, the unmanned air vehicle includes one generator.

Figure 4:
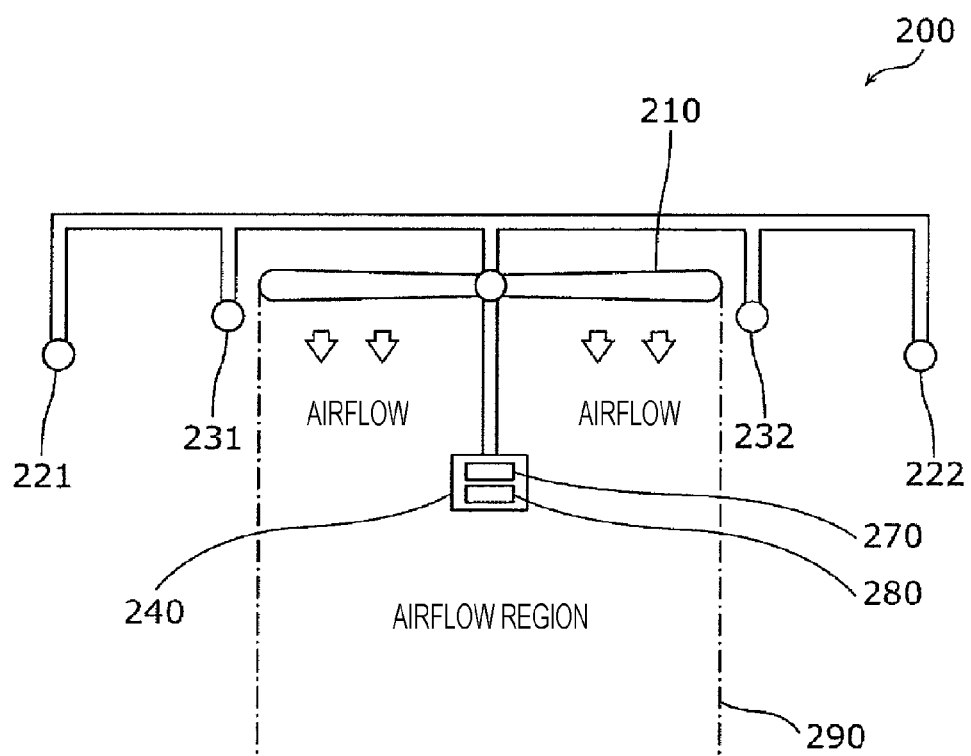
FIG. 4 is a cross-sectional view illustrating a structure of an unmanned air vehicle according to a first modification.

FIG. 4 is a cross-sectional view illustrating a structure of the unmanned air vehicle according to the first modification. The unmanned air vehicle 200 illustrated in FIG. 4 includes one generator 210, two main microphones 221 and 222, two sub-microphones 231 and 232, a housing 240, a processor 270, and a memory 280. In the present modification, each constituent element of the plurality of constituent elements of the unmanned air vehicle 200 corresponds to at least one constituent element of the plurality of constituent elements of the unmanned air vehicle 100 according to the embodiment described above.

More specifically, the generator 210 corresponds to the generators 111 to 114, the main microphones 221 and 222 correspond to the main microphone 120, and the sub-microphones 231 and 232 correspond to the sub-microphones 131 to 134. The housing 240, the processor 270, and the memory 280 respectively correspond to the housing 140, the processor 170, and the memory 180. Each of the constituent elements of the unmanned air vehicle 200 basically has a similar feature to that of a corresponding one or more constituent elements of the unmanned air vehicle 100.

In the unmanned air vehicle 200, in contrast to the unmanned air vehicle 100 including the four generators 111 to 114, the single generator 210 is provided, and the main microphones 221 and 222 and the sub-microphones 231 and 232 are disposed in an external region outside the airflow region 290 defined for the single generator 210. The sub-microphone 231 is located between the main microphone 221 and the generator 210, and the sub-microphone 232 is located between the main microphone 222 and the generator 210.

In this configuration, an airflow generated by the generator 210 is suppressed from hitting the main microphones 221 and 222 and the sub-microphones 231 and 232, which prevents a wind noise from being input to the main microphones 221 and 222 and the sub-microphones 231 and 232. Thus, the unmanned air vehicle 200 including the single generator 210 is capable of properly sensing an ambient sound around the unmanned air vehicle 200 and noise generated by the generator 210 by using the main microphones 221 and 222 and the sub-microphones 231 and 232.

It is possible to properly remove the noise generated by the generator 210 from the sound sensed by the main microphone 221 by removing the noise sensed by the sub-microphone 231 from the sound sensed by the main microphone 221. Furthermore, it is possible to properly remove the noise generated by the generator 210 from the sound sensed by the main microphone 222 by removing the noise sensed by the sub-microphone 232 from the sound sensed by the main microphone 222.

A first airflow region and a second airflow region may be defined for the generator 210 in a similar manner as shown in FIG. 3, and the main microphones 221 and 222 and the sub-microphones 231 and 232 may be disposed in an external region of both the first airflow region and the second airflow region.

In the embodiment described above, each of the generators 111 to 114 of the unmanned air vehicle 100 generates a force component to drive the unmanned air vehicle 100 to fly. The generator 210 of the unmanned air vehicle 200 according to the present modification also generates a force component to drive the unmanned air vehicle 200 to fly. However, this force component can be regarded as the force itself that drives the unmanned air vehicle 200 to fly.

Second Modification

In a second modification described below, an unmanned air vehicle includes, as with the unmanned air vehicle 100 according to the embodiment, generators 111 to 114, a main microphone 120, sub-microphones 131 to 134, a housing 140, a processor 170, and a memory 180. However, the unmanned air vehicle according to the present modification is different from the unmanned air vehicle 100 according to the embodiment described above in that the generators 111 to 114 have features different from those of the unmanned air vehicle 100 according to the embodiment described above.

Figure 5:
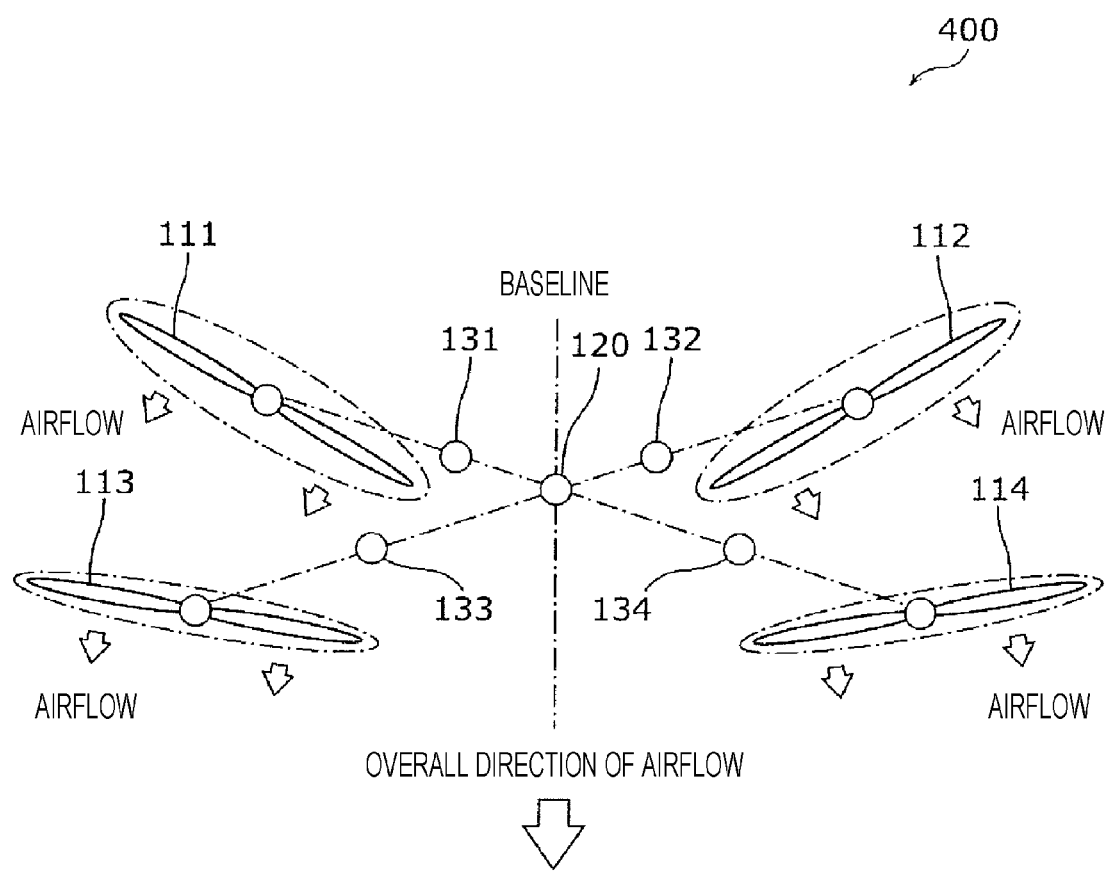
FIG. 5 is a schematic diagram illustrating a structure of an unmanned air vehicle according to a second modification.

FIG. 5 is a schematic diagram illustrating a structure of the unmanned air vehicle according to the present modification. As shown in FIG. 5, the unmanned air vehicle 400 according to the present modification is similar to the unmanned air vehicle 100 according to the embodiment described above in that there is no crossing among directions in which airflows are output from the respective generators 111 to 114 but different in that the directions of the airflows are not parallel to each other. More specifically, the generators 111 to 114 are slanted. That is, when the unmanned air vehicle 400 is in flight, planes perpendicular to the directions of airflows generated by the respective generators 111 to 114 are slanted from a horizontal plane perpendicular to the gravitational direction.

The generator 111 generates an airflow such that as the airflow generated by the generator 111 flows away from the generator 111, the airflow generated by the generator 111 goes away from a baseline defined in a specific direction in common for the generators 111 to 114. That is, the generator 111 is slanted such that as the airflow generated by the generator 111 flows away from the generator 111, the airflow generated by the generator 111 goes away from the baseline defined in common for the generators 111 to 114.

The generator 112 is also slanted in a similar manner. That is, as the airflow generated by the generator 112 flows away from the generator 112, the airflow generated by the generator 112 goes away from the baseline defined in common for the generators 111 to 114. The generators 113 and 114 are also slanted in a similar manner.

The specific direction is a direction defined in common for the generators 111 to 114, and more specifically, for example, an overall direction in which airflows flow as a whole from the generators 111 to 114. The specific direction may be an average direction of the four airflows generated by the generators 111 to 114. For example, the specific direction may be a downward direction when the unmanned air vehicle 400 is in flight. In other words, the specific direction may be a gravitational direction when the unmanned air vehicle 400 is in flight.

The baseline in the specific direction for the generators 111 to 114 may be defined, for example, by a line passing though a point in the middle of the generators 111 to 114 and extending in the specific direction. The line passing the point in the middle of the generators 111 to 114 may be a line passing though a position surrounded by the generators 111 to 114, or may be a line passing through a center of the generators 111 to 114, or otherwise may be a line passing through an average position of the generators 111 to 114.

The directions of the airflows output from the generators 111 to 114 are directions in which the unmanned air vehicle 400 is allowed to travel in flight. More specifically, the angle between the specific direction and each of the directions of the airflows generated by the generators 111 to 114 falls within a particular angle within which the unmanned air vehicle 400 is allowed to travel in flight. That is, the generators 111 to 114 are slanted within ranges in which it is allowed to obtain forces to drive the unmanned air vehicle 400 to fly. For example, the particular angle may be equal to 35°, 40°, or 45°. Note that 35°, 40°, and 45° are merely examples, and the particular angle is not limited to 35°, 40°, or 45°.

Figure 6:
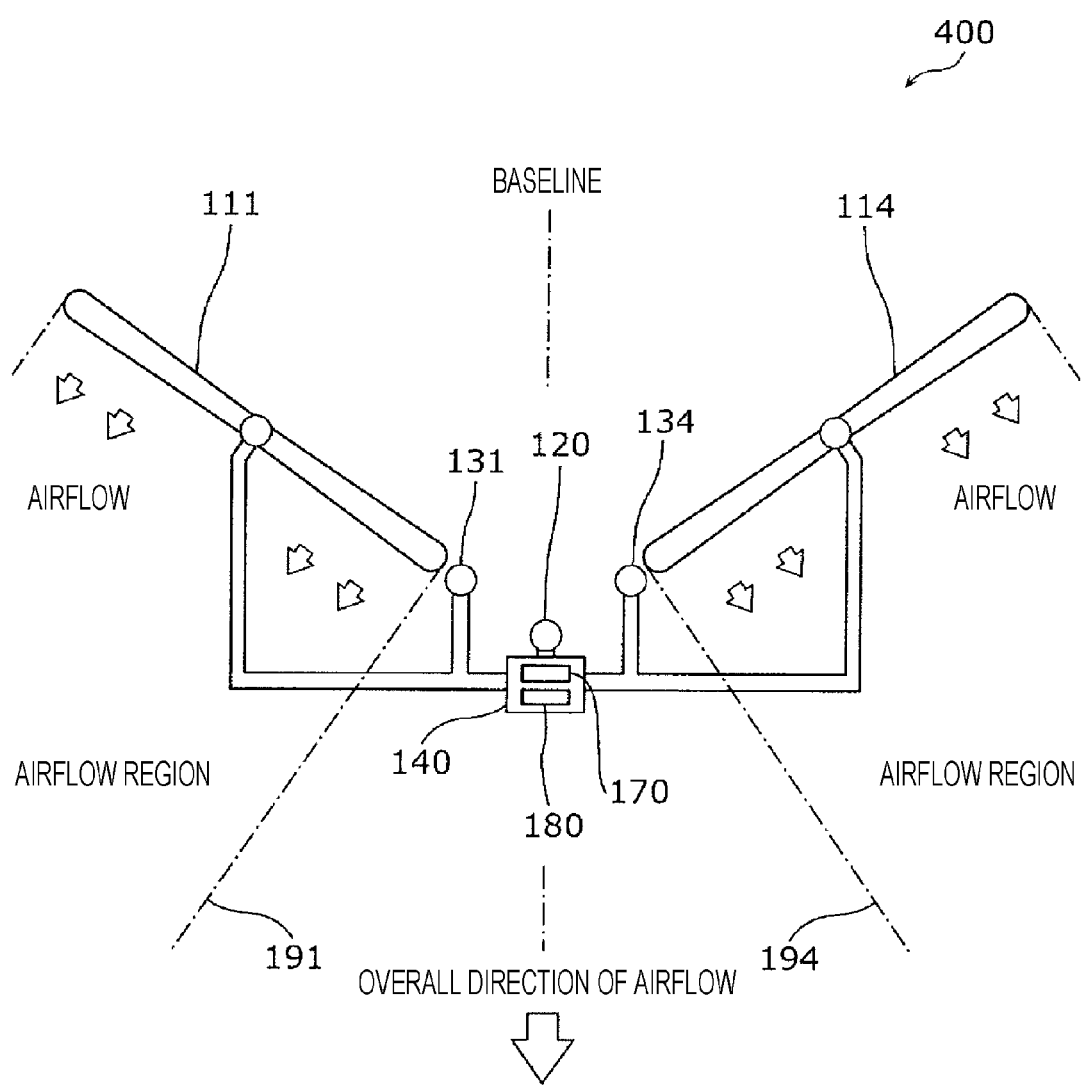
FIG. 6 is a cross-sectional view illustrating a structure of an unmanned air vehicle according to the second modification.

FIG. 6 is a cross-sectional view illustrating a structure of the unmanned air vehicle 400 illustrated in FIG. 5. More specifically, FIG. 6 conceptually illustrates cross sections taken vertically across the generators 111 and 114 of the unmanned air vehicle 400 illustrated in FIG. 5. Cross sections of the generators 112 and 113 are basically similar to those of the generators 111 and 114 although the cross sections of the generators 112 and 113 are not illustrated.

As described above, in the unmanned air vehicle 400, unlike the unmanned air vehicle 100, the generators 111 to 114 are slanted. More specifically, in the unmanned air vehicle 400, the generators 111 to 114 are supported by one or more support structures such that the generators 111 to 114 are slanted.

For example, the generator 111 generates an airflow such that as the airflow generated by the generator 111 flows away from the generator 111, the airflow generated by the generator 111 goes away from the baseline defined by the overall airflow direction. Similarly, the generator 114 generates an airflow such that as the airflow generated by the generator 114 flows away from the generator 114, the airflow generated by the generator 114 goes away from the baseline defined by the overall airflow direction.

In this configuration, each airflow goes away from the baseline as the airflow flows in the overall airflow direction. Note that the airflow region 191 of the generator 111 and the airflow region 194 of the generator 114 each go away from the baseline. Similarly, airflow regions of the respective generators 112 and 113 go away from the baseline.

Thus, by configuring the unmanned air vehicle 400 in the above-described manner, it becomes possible to provide a region, surrounded by the four airflow regions corresponding to the respective four generators 111 to 114, large enough to dispose the main microphone 120 and the sub-microphones 131 to 134. Thus, it is possible to dispose the main microphone 120 and the sub-microphones 131 to 134 at proper locations.

For example, the sub-microphone 131 may be disposed at a location between the main microphone 120 and the generator 111 such that the sub-microphone 131 is apart from the main microphone 120. Similarly, the sub-microphone 134 may be disposed at a location between the main microphone 120 and the generator 114 such that the sub-microphone 134 is apart from the main microphone 120. The sub-microphones 132 and 133 may also be disposed in a similar manner. Thus, the unmanned air vehicle 400 is capable of properly sensing a sound and a noise.

To reduce the weight of the unmanned air vehicle 400, support structures for supporting the respective generators 111 to 114 may be shorten, which may result in a reduction in distance among the generators 111 to 114. Even in such a case, the slanting of the generators 111 to 114 makes it possible for the unmanned air vehicle 400 to have a sufficiently large region in which the main microphone 120 and the sub-microphones 131 to 134 are disposed.

Also in the present modification, the main microphone 120 and the sub-microphones 131 to 134 may be disposed in both an external region outside the first airflow region at the downstream side of the airflow and an external region outside the second airflow region at the upstream side of the airflow as in the case shown in FIG. 3.

The directions of the airflows generated by the respective generators 111 to 114 do not necessarily need to be different from each other. For example, as described above, the airflows may be generated by the respective generators 111 to 114 such that as the airflows flow, each airflow goes away from the baseline defined by the overall airflow direction. In this case, the generators 111 and 112 may generate airflows in directions parallel to each other. Similarly, the generators 113 and 114 may generate airflows in directions parallel to each other. Alto in this configuration, the deviations of the airflow regions from the baseline make it possible to provide a proper space where the main microphone 120 and the sub-microphones 131 to 134 are allowed to be disposed.

Third Modification

In a third modification described below, an unmanned air vehicle includes, as with the unmanned air vehicle 100 according to the embodiment described above, generators 111 to 114, a main microphone 120, sub-microphones 131 to 134, a housing 140, and other elements. In the present modification, as with the second modification, the generators 111 to 114 are slanted. Furthermore, in the present modification, controlling is performed in term of slanting of the respective generators 111 to 114, positions of the respective sub-microphones 131 to 134, and sound sensing directions of the respective sub-microphones 131 to 134.

Figure 7:
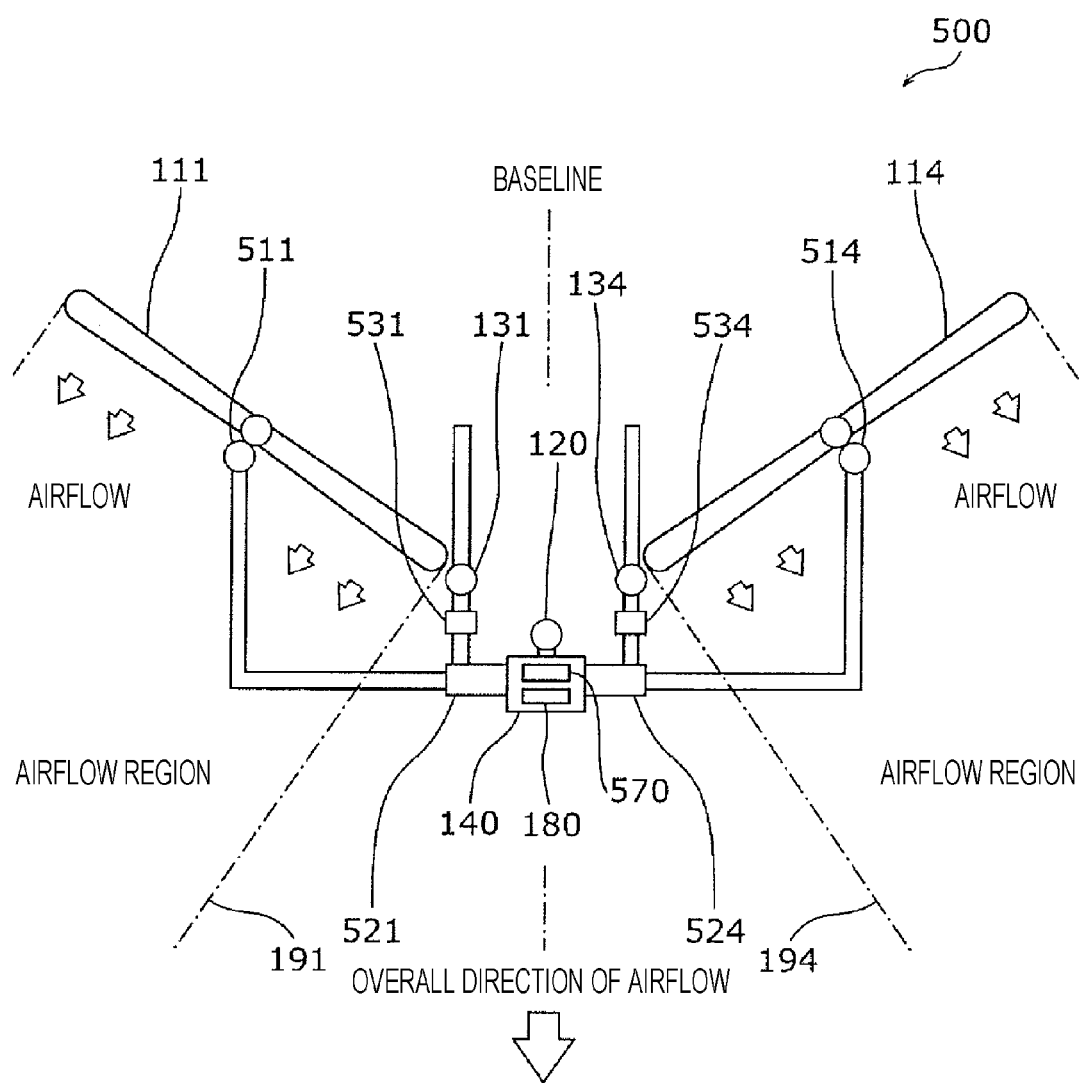
FIG. 7 is a cross-sectional view illustrating a structure of an unmanned air vehicle according to a third modification.

FIG. 7 is a cross-sectional view illustrating a structure of the unmanned air vehicle according to the present modification. More specifically, FIG. 7 conceptually illustrates cross sections taken vertically across the generators 111 and 114 of the unmanned air vehicle 500 according to the present modification. Cross sections of the generators 112 and 113 are basically similar to those of the generators 111 and 114 although the cross sections of the generators 112 and 113 are not illustrated.

The unmanned air vehicle 500 further includes angle control actuators (first actuators) 511 and 514, position control actuators (second actuators) 521 and 524, and direction control actuators (third actuators) 531 and 534. Similarly, the unmanned air vehicle 500 also includes angle control actuators respectively corresponding to the generators 112 and 113, position control actuators respectively corresponding to the sub-microphones 132 and 133, and direction control actuators respectively corresponding to the sub-microphones 132 and 133.

More specifically, the angle control actuators control directions of airflows generated by the respective generators 111 to 114. More specifically, the angle control actuator 511 controls the slanting of the generator 111, and the angle control actuator 511 is also referred to as the first actuator or a slant control actuator. That is, the angle control actuator 511 controls an angle between the direction of the airflow generated by the generator 111 and the overall airflow direction.

For example, the angle control actuator 511 controls the angle between the direction of the airflow generated by the generator 111 and the overall airflow direction within the particular angle by rotating the generator 111 about an axis extending in a direction perpendicular to the direction of the airflow generated by the generator 111. The particular angle may be the particular angle described above in the second modification.

Similarly, the angle control actuator 514 controls the slant of the generator 114. That is, the angle control actuator 514 controls the angle between the direction of the airflow generated by the generator 114 and the overall airflow direction. Similarly, the angle control actuator corresponding to the generator 112 controls the slant of the generator 112, and the angle control actuator corresponding to the generator 113 controls the slant of the generator 113.

The position control actuator 521 controls the position of the sub-microphone 131. The position control actuator 521 is also referred to as the second actuator. For example, the position control actuator 521 is a 2-axis actuator and controls the position of the sub-microphone 131 in the overall airflow direction and the distance between the sub-microphone 131 and the baseline along the overall airflow direction.

Similarly, the position control actuator 524 controls the position of the sub-microphone 134. Similarly, the position control actuator corresponding to the sub-microphone 132 controls the position of the sub-microphone 132, and the position control actuator corresponding to the sub-microphone 133 controls the position of the sub-microphone 133.

The direction control actuator 531, which is also referred to as the third actuator, controls a sound sensing direction of the sub-microphone 131. For example, each of the sub-microphones 131 to 134 has a direction in which the sound sensitivity is higher than the other directions, and this direction is defined as the sound sensing direction. The direction control actuator 531 controls the sound sensing direction of the sub-microphone 131 by rotating the shaft of the position control actuator 521 connected to the sub-microphone 131.

Similarly, the direction control actuator 534 controls the sound sensing direction of the sub-microphone 134. Similarly, the direction control actuator corresponding to the sub-microphone 132 controls the sound sensing direction of the sub-microphone 134, and the direction control actuator corresponding to the sub-microphone 133 controls the sound sensing direction of the sub-microphone 133.

The unmanned air vehicle 500 includes, in a housing 140, a processor 570 and a memory 180. The processor 570 and the memory 180 of the unmanned air vehicle 500 are basically similar to the processor 170 and the memory 180 of the unmanned air vehicle 100 except that the processor 570 of the unmanned air vehicle 500 performs further operations in addition to the operations performed by the processor 170 of the unmanned air vehicle 100.

More specifically, the processor 570 of the unmanned air vehicle 500 performs, in addition to the operations performed by the processor 170 of the unmanned air vehicle 100, processes to operate the respectively angle control actuators, the respective position control actuators, and the respective direction control actuators. For example, the processor 570 controls the operations of the actuators by transmitting control signals to the actuators via wired or wireless communication.

Note that the above-described actuators that control the slant of the generator 111, the position of the sub-microphone 131, and the sound sensing directions of the sub-microphone 131 or the like are merely examples, and the details of the actuators are not limited to the examples described above. That is, the control mechanisms are not limited to the examples described above.

Figure 8:
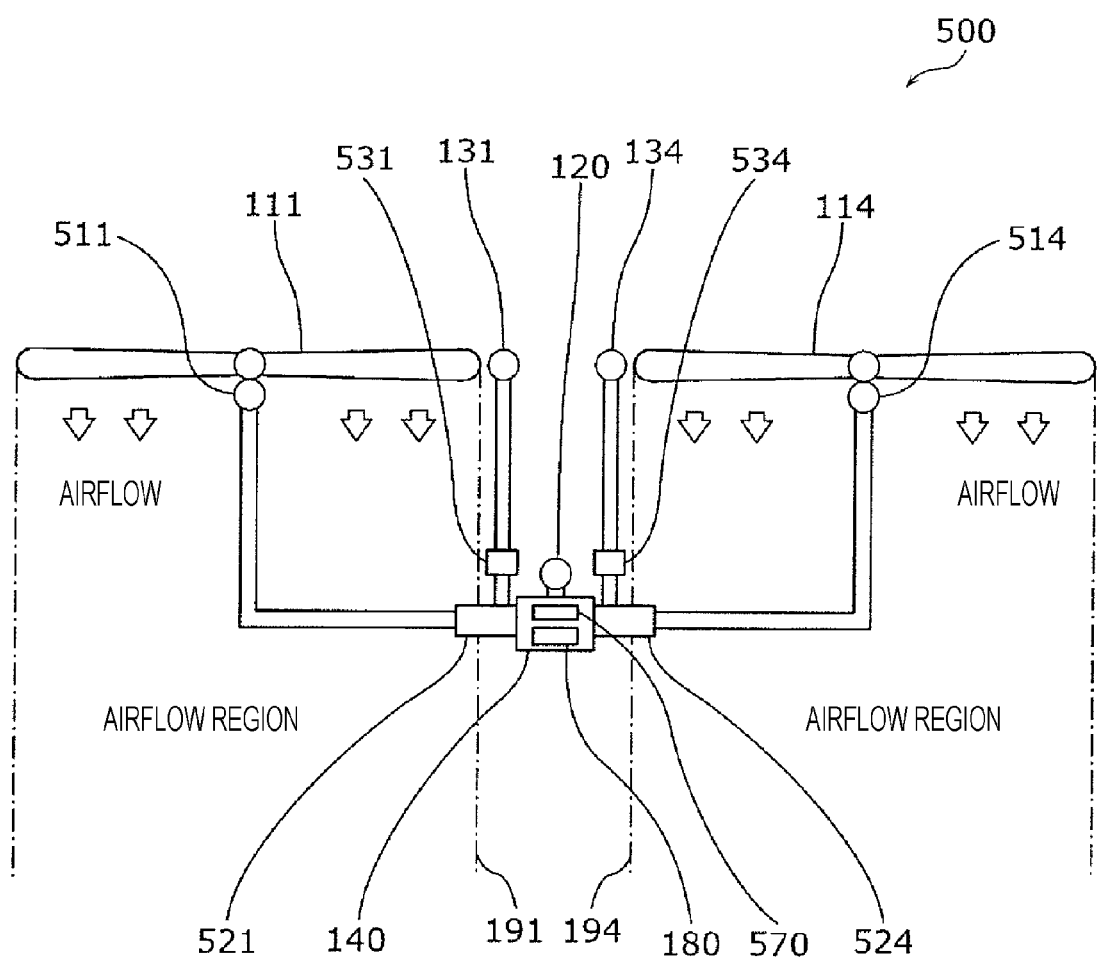
FIG. 8 is a diagram illustrating a state in which the generators according to the third modification are not slanted.

FIG. 8 is a diagram illustrating a state in which the generators 111 and 114 shown in FIG. 7 are not slanted.

For example, the angle control actuators reduce the angle between the directions in which of the airflows are output by the respective generators 111 to 114 when the unmanned air vehicle moves. More specifically, when the unmanned air vehicle 500 moves, the angle control actuator 511 reduces the slant of the generator 111. That is, when the unmanned air vehicle 500 moves, the angle control actuator 511 reduces the angle between the direction of the airflow generated by the generator 111 and the overall airflow direction.

More specifically, the processor 570 makes a judgment as to the movement of the unmanned air vehicle 500. The processor 570 may make the judgment as to the movement of the unmanned air vehicle 500 according to an operation signal received from an external apparatus, or may make the judgment as to the movement of the unmanned air vehicle 500 by detecting a state of the unmanned air vehicle 500. When the unmanned air vehicle 500 moves, the processor 570 controls the angle control actuator 511 so as to reduce the slant of the generator 111.

More specifically, when the unmanned air vehicle 500 starts to move, the processor 570 controls the angle control actuator 511 so as to reduce the slant of the generator 111. When the unmanned air vehicle 500 ends the movement, the processor 570 controls the angle control actuator 511 so as to increase the slant of the generator 111. That is, the processor 570 controls the angle control actuator 511 such that the angle between the direction of the airflow generated by the generator 111 and the overall airflow direction is smaller during a period in which the unmanned air vehicle 500 moves, than during a period in which the unmanned air vehicle 500 does not move.

In the example shown in FIG. 8, the angle control actuator 511 reduces the slant of the generator 111 until the generator 111 has no slant. That is, the angle control actuator 511 reduces the angle between the direction of the airflow generated by the generator 111 and the overall airflow direction until the angle reaches 0°. Note that 0° is merely an example, and the angle control actuator 511 may reduce the angle between the direction of the airflow generated by the generator 111 and the overall airflow direction until the angle reaches a minimum value greater than 0°.

Similarly, when the unmanned air vehicle 500 moves, the angle control actuator 514 reduces the slant of the generator 114. That is, when the unmanned air vehicle 500 moves, the angle control actuator 514 reduces the angle between the direction of the airflow generated by the generator 114 and the overall airflow direction. More specifically, when the unmanned air vehicle 500 moves, the processor 570 controls the angle control actuator 514 so as to reduce the slant of the generator 114.

Similarly, the unmanned air vehicle 500 moves, the processor 570 controls the angle control actuator corresponding to the generator 112 so as to reduce the slant of the generator 112, and controls the angle control actuator corresponding to the generator 113 so as to reduce the slant of the generator 113.

For example, changes in the slants of the generators 111 to 114 result in changes in the directions of the airflows. As a result, changes occur in the airflow regions 191 to 194, and a change also occurs in the external region outside the airflow regions 191 to 194. On the other hand, the sub-microphone 131 is located within the external region regardless of the changes in the directions of the airflows generated by the generators 111 to 114. More specifically, the processor 570 controls the position control actuator 521 such that the sub-microphone 131 is located within the changed external region.

The position control actuator 521 may control the position of the sub-microphone 131 so as to maintain the relative relationship among the direction of the airflow generated by the generator 111, the position of the generator 111, and the sub-microphone 131. More specifically, the position control actuator 521 may control the position of the sub-microphone 131 so as to maintain the distance between the generator 111 and the sub-microphone 131 and the angle between the direction from the generator 111 toward the sub-microphone 131 and the direction of the airflow generated by the generator 111.

Similarly, the processor 570 controls the position control actuator 524 such that the sub-microphone 134 is located within the changed external region. The position control actuator 524 may control the position of the sub-microphone 134 so as to maintain the relative relationship among the direction of the airflow generated by the generator 114, the position of the generator 114, and the sub-microphone 131.

Similarly, the processor 570 controls the position control actuators corresponding to the respective sub-microphones 132 and 133 such that the sub-microphones 132 and 133 are located within the changed external region.

Thus, when the unmanned air vehicle 500 is in a moving state, the unmanned air vehicle 500 is capable of reducing the slant of each of the generators 111 to 114 while suppressing a wind noise from being input to the sub-microphones. This makes it possible for the unmanned air vehicle 500 to suppress a force from occurring in a direction opposite to the moving direction.

For example, when the unmanned air vehicle 500 moves in a horizontal direction, if the generator 111 of the generators 111 to 114 is located on the front side as seen in the moving direction of the unmanned air vehicle 500 and the generator 111 is slanted as shown in FIG. 7, the generator 111 generates a force in a direction opposite to the moving direction. This force generated by the generator 111 in the direction opposite to the moving direction impedes the moving of the unmanned air vehicle 500. To handle this situation, the unmanned air vehicle 500 is capable of reducing the slants of the respective generators 111 to 114 when the unmanned air vehicle 500 moves in flight thereby reducing unnecessary energy consumption during the flight.

Furthermore, the unmanned air vehicle 500 is capable of controlling the positions of the respective sub-microphones 131 to 134 adaptively depending on a change in the overall airflow region caused by the changes in the slants of the respective generators 111 to 114. This makes it possible for the unmanned air vehicle 500 to suppress a wind noise from being input to the sub-microphones 131 to 134 even when a change occurs in the slant of any one of the generators 111 to 114.

When the unmanned air vehicle 500 moves in a horizontal direction in flight, the unmanned air vehicle 500 may reduce the slants of the respective generators 111 to 114. When the unmanned air vehicle 500 moves in a gravitational direction, the unmanned air vehicle 500 may not reduce the slants of the respective generators 111 to 114. When the unmanned air vehicle 500 moves in a direction opposite to the gravitational direction, the unmanned air vehicle 500 may reduce the slants of the respective generators 111 to 114 to achieve an efficient movement.

When the unmanned air vehicle 500 moves in a horizontal direction in flight, the unmanned air vehicle 500 may reduce the slant of one or more generators, located on the front side in the moving direction, of the generators 111 to 114 and may not reduce the slant of the other one or more generators. In this case, the unmanned air vehicle 500 may change the positions of the respective four sub-microphones 131 to 134. In this case, alternatively, the unmanned air vehicle 500 may change the position of one or more sub-microphones corresponding to the one or more generators located on the front side as seen in the moving direction, and may not change the position of the other one or more sub-microphones.

The unmanned air vehicle 500 may reduce the slants of the respective generators 111 to 114 during a period in which sensing of a sound by the main microphone 120 is not performed. That is, during the period in which the sound sensing by the main microphone 120 is not performed, the unmanned air vehicle 500 may reduce the angles of the airflows of the respective generators 111 to 114 with respect to the overall airflow direction. This makes it possible for the unmanned air vehicle 500 to move in an efficient manner during the period in which the sound sensing by the main microphone 120 is not performed.

In this case, the unmanned air vehicle 500 may or may not change the positions of the respective four sub-microphones 131 to 134.

In the example described above, the sub-microphones are maintained within the external region by controlling the positions of the sub-microphones. However, alternatively, the sub-microphones may be fixed at locations such that the sub-microphones are not located in the first airflow region no matter how the directions of the airflows generated by the generators change.

Figure 9:
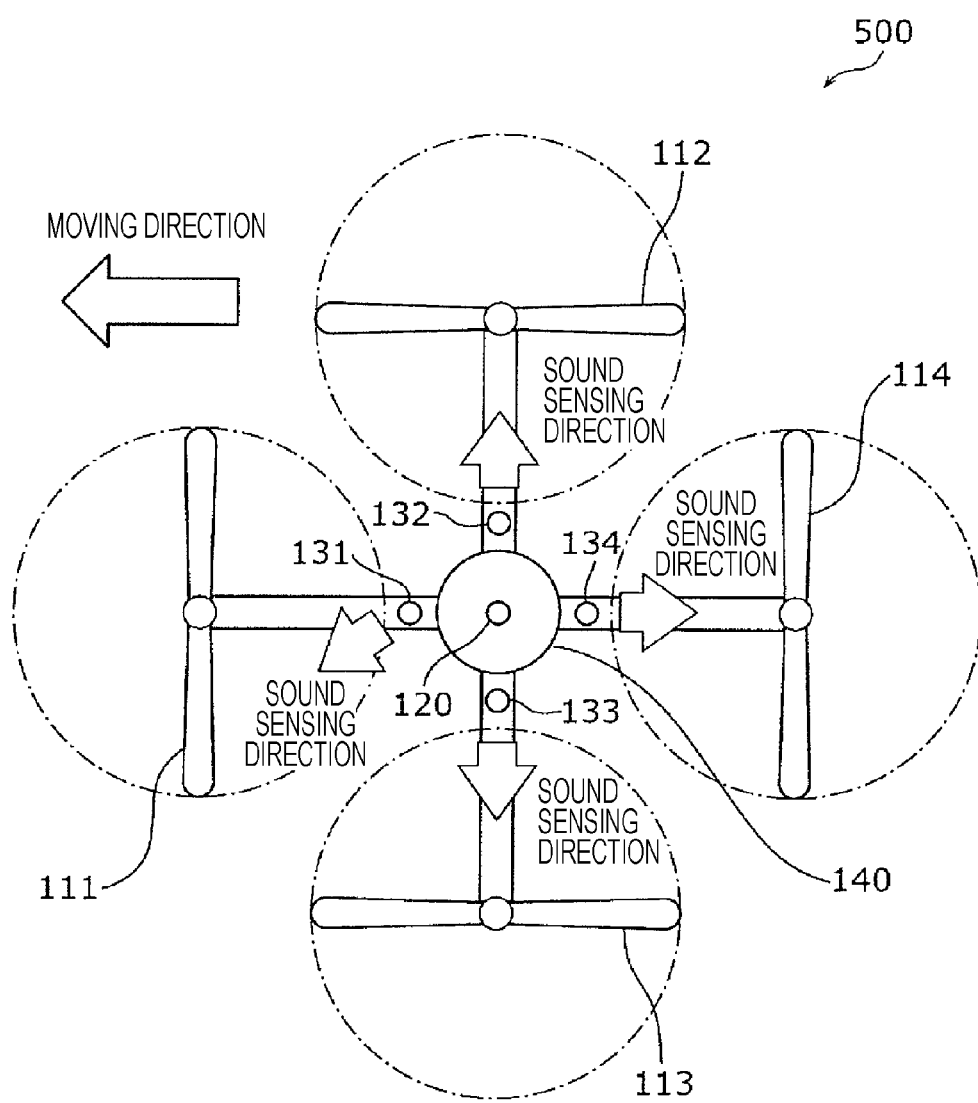
FIG. 9 is a schematic diagram illustrating sound sensing directions according to the third modification.

FIG. 9 is a schematic diagram illustrating sound sensing directions of the respective sub-microphones 131 to 134 illustrated in FIG. 7, wherein the unmanned air vehicle 500 is shown from the upstream side of the overall airflow direction.

For example, the processor 570 controls the direction control actuator 531 such that the sound sensing direction of the sub-microphone 131 changes adaptively according to a change in the moving direction of the unmanned air vehicle 500. In response, the direction control actuator 531 changes the sound sensing direction of the sub-microphone 131 according to the change in the moving direction of the unmanned air vehicle 500.

More specifically, the processor 570 makes a judgment as to the moving direction of the unmanned air vehicle 500. That is, the processor 570 detects the moving direction of the unmanned air vehicle 500. The processor 570 may make the judgment as to the moving direction of the unmanned air vehicle 500 according to an operation signal received from an external apparatus, or may make the judgment as to the moving direction of the unmanned air vehicle 500 by detecting a state of the unmanned air vehicle 500. The processor 570 then changes the sound sensing direction of the sub-microphone 131 via the direction control actuator 531 according to the change in the detected moving direction.

Similarly, the processor 570 controls the direction control actuator 534 such that the sound sensing direction of the sub-microphone 134 changes according to a change in the moving direction of the unmanned air vehicle 500. In response, the direction control actuator 534 changes the sound sensing direction of the sub-microphone 134 according to the change in the moving direction of the unmanned air vehicle 500.

Similarly, the processor 570 controls the direction control actuator corresponding to the sub-microphone 132 such that the sound sensing direction of the sub-microphone 132 changes according to the change in the moving direction of the unmanned air vehicle 500. Furthermore, the processor 570 controls the direction control actuator corresponding to the sub-microphone 133 such that the sound sensing direction of the sub-microphone 133 changes according to the change in the moving direction of the unmanned air vehicle 500.

For example, in a case where the unmanned air vehicle 500 is not in a moving state, the position of the sub-microphone 131 is controlled such that the sound sensing direction thereof is toward to the generator 111. Similarly, in this case, the position of the sub-microphone 132 is controlled such that the sound sensing direction thereof is toward to the generator 112, the position of the sub-microphone 133 is controlled such that the sound sensing direction thereof is toward to the generator 113, and the position of the sub-microphone 134 is controlled such that the sound sensing direction thereof is toward to the generator 114.

For example, in a case where the generator 111 is located on a front-facing position in the movement of the unmanned air vehicle 500 as shown in FIG. 9, the processor 570 controls the direction control actuator 531 such that the sound sensing direction of the sub-microphone 131 is different from the moving direction of the unmanned air vehicle 500.

In this case, the direction control actuator 531 may control the sound sensing direction of the sub-microphone 131 such that the sound sensing direction of the sub-microphone 131 is different from the moving direction of the unmanned air vehicle 500 within a range in which the sound generated by the generator 111 can be sensed. For example, the direction control actuator 531 may control the difference between the sound sensing direction and the moving direction such that the angle between the sound sensing direction and the direction toward the generator 111 from the sub-microphone 131 is maintained within a particular range smaller than 45°.

In this case, the sound sensing direction of the sub-microphone 132 is maintained toward the generator 112, the sound sensing direction of the sub-microphone 133 is maintained toward the generator 113, and the sound sensing direction of the sub-microphone 134 is maintained toward the generator 114. Alternatively, in this case, the sound sensing directions of the respective sub-microphones 132 and 133 may be deviated from the moving direction.

For example, in a case where the generator 114 is located on the front side as seen in the movement of the unmanned air vehicle 500, the processor 570 controls the direction control actuator 534 such that the sound sensing direction of the sub-microphone 134 is different from the moving direction of the unmanned air vehicle 500. In this case, the direction control actuator 534 may control the sound sensing direction of the sub-microphone 134 such that the sound sensing direction of the sub-microphone 134 is different from the moving direction of the unmanned air vehicle 500 within a range in which the sound generated by the generator 114 can be sensed.

In this case, the processor 570 controls the direction control actuator 531 such that the sound sensing direction of the sub-microphone 131 is towered the generator 111. Furthermore, in this case, the sound sensing direction of the sub-microphone 132 is maintained toward the generator 112, and the sound sensing direction of the sub-microphone 133 is maintained toward the generator 113. In this case, alternatively, the sound sensing directions of the respective sub-microphones 132 and 133 may be deviated from the moving direction.

In a state in which the sound sensing direction is in the moving direction, there is a possibility that a wind, that occurs by a relative movement, may cause a wind noise to be input to the sub-microphones 131 to 134. To handle this situation, the unmanned air vehicle 500 is capable of changing the sound sensing direction properly depending on a change in the moving direction to suppress the wind noise from being input to the sub-microphones 131 to 134.

The unmanned air vehicle 500 may further include a direction control actuator that controls the sound sensing direction of the main microphone 120. The processor 570 may control the direction control actuator such that the sound sensing direction of the main microphone 120 is different from the moving direction of the unmanned air vehicle 500.

Although the unmanned air vehicle 500 changes the sound sensing direction to left or right in a direction perpendicular to the overall airflow direction in the example described above, the sound sensing direction may be changed in an upward or downward direction perpendicular to the overall airflow direction.

In the example described above, to change the sound sensing direction of the sub-microphone 131, the direction control actuator 531 rotates the shaft of the position control actuator 521. Alternatively, the direction control actuator 531 may be disposed inside the sub-microphone 131 and the direction control actuator 531 may rotate an element of the sub-microphone 131 in an upward or downward direction or in a right or left direction thereby changing the sound sensing direction of the sub-microphone 131. The other direction control actuators may be configured and operated in a similar manner.

In the present modification, the unmanned air vehicle 500 may include one of the angle control actuator, the position control actuator and the direction control actuator, and may control one of the slant, the position, and the sound sensing direction.

For example, the unmanned air vehicle 500 may not include the direction control actuator or may not include the position control actuator. The unmanned air vehicle 500 may not include the angle control actuator and the position control actuator. That is, part of the present modification may be applied to the embodiment or the second modification or the like described above.

Fourth Modification

In a fourth modification described below, an unmanned air vehicle includes, as with the unmanned air vehicle 500 according to the third modification, generators 111 to 114, a main microphone 120, sub-microphones 131 to 134, and a housing 140. Furthermore, the unmanned air vehicle according to the present modification also includes, as with the unmanned air vehicle 500 according to the third modification, angle control actuators respectively corresponding to the generators 111 to 114. However, in the present modification, unlike the third modification, the sub-microphones are fixed to connection elements firmly connected to the respective generators.

Figure 10:
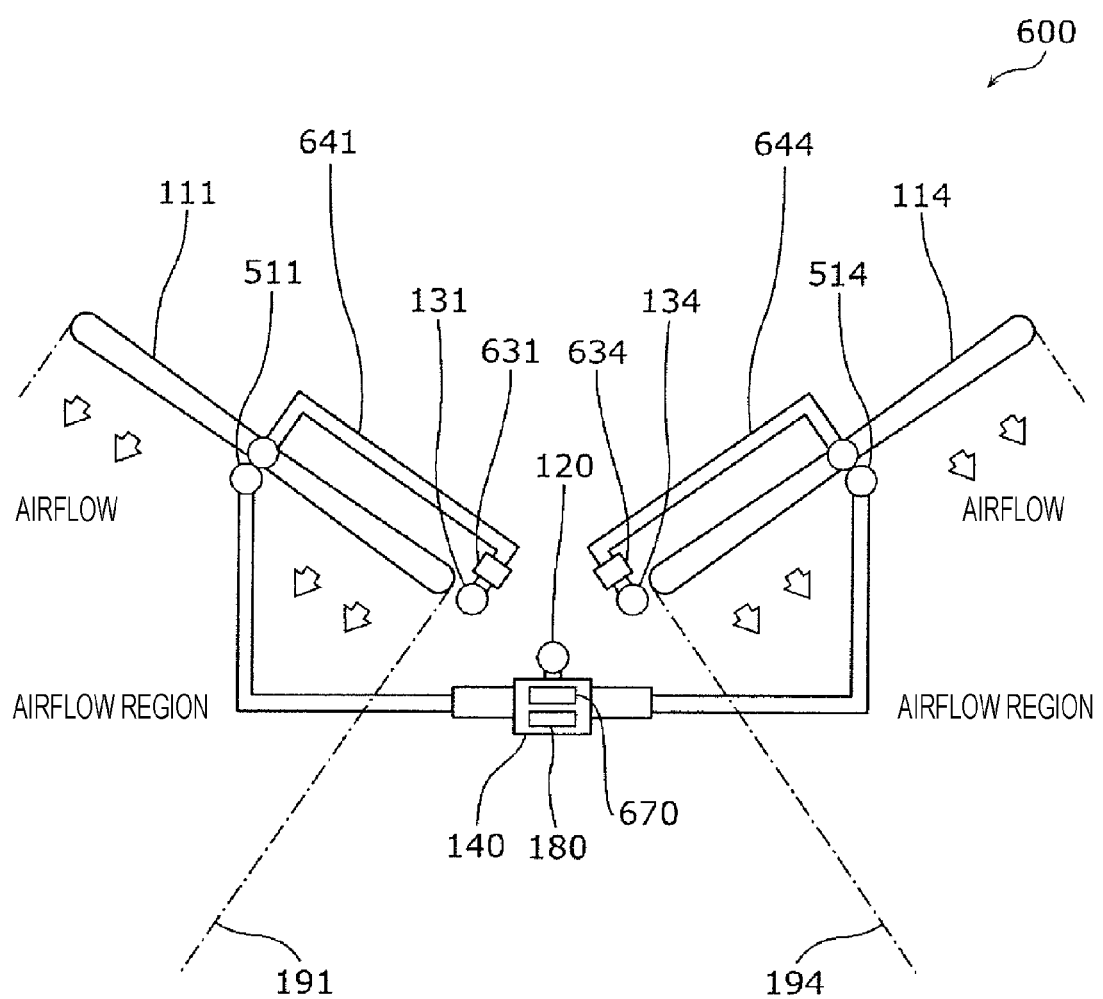
FIG. 10 is a cross-sectional view illustrating a structure of an unmanned air vehicle according to a fourth modification.

FIG. 10 is a cross-sectional view illustrating a structure of the unmanned air vehicle according to the present modification. More specifically, FIG. 10 conceptually illustrates cross sections taken vertically across the generators 111 and 114 of the unmanned air vehicle 600 according to the present modification. Cross sections of the generators 112 and 113 are basically similar to those of the generators 111 and 114 although the cross sections of the generators 112 and 113 are not illustrated.

For example, the unmanned air vehicle 600 according to the present modification is different from the unmanned air vehicle 500 according to the third modification in that the unmanned air vehicle 600 includes connection elements 641 and 644 and direction control actuators 631 and 634. Furthermore, the unmanned air vehicle 600 also includes connection elements corresponding to respective generators 112 and 113, and direction control actuators corresponding to respective sub-microphones 132 and 133.

That is, the unmanned air vehicle 600 according to the present modification is different from the unmanned air vehicle 500 according to the third modification in that instead of the position control actuators corresponding to the respective sub-microphones 131 to 134, the connection elements corresponding to the respective generators 111 to 114 are provided. Furthermore, the unmanned air vehicle 600 is different from the unmanned air vehicle 500 in the mechanisms of direction control actuators corresponding to the respective sub-microphones 131 to 134.

The connection element 641 is a structural component firmly connected to the generator 111, and the sub-microphone 131 is fixed to the connection element 641. In this configuration, the position of the connection element 641 changes in accordance with a change in the slant of the generator 111, and the position of the sub-microphone 131 changes in accordance with the change in the position of the connection element 641. For example, the angle control actuator 511 changes the position of the connection element 641 by changing the slant of the generator 111 thereby changing the position of the sub-microphone 131.

Similarly, the sub-microphone 134 is fixed to the connection element 644 firmly connected to the generator 114. Thus, the position of the sub-microphone 134 changes in accordance with a change in the slant of the generator 114. For example, the angle control actuator 514 changes the position of the connection element 644 by changing the slant of the generator 114 thereby changing the position of the sub-microphone 134.

Similarly, the sub-microphone 132 is fixed to the connection element firmly connected to the generator 112, and the position of the sub-microphone 134 changes in accordance with a change in the slant of the generator 112. Furthermore, the sub-microphone 133 is fixed to the connection element firmly connected to the generator 113, and the position of the sub-microphone 133 changes in accordance with a change in the slant of the generator 113.

The angle control actuator 511 controls the slant of the generator 111 thereby controlling the position of the sub-microphone 131, and thus the angle control actuator 511 functions in a similar manner to the position control actuator 521 according to the third modification. Similarly, the angle control actuator 514 controls the slant of the generator 114 thereby controlling the position of the sub-microphone 134, and thus the angle control actuator 514 functions in a similar manner to the position control actuator 524 according to the third modification. Similarly, angle control actuators respectively corresponding to the generators 112 and 113 function in a similar manner to the position control actuators according to the third modification.

Furthermore, The direction control actuator 631 controls the sound sensing direction of the sub-microphone 131. The direction control actuator 631 controls the sound sensing direction of the sub-microphone 131 by rotating the shaft of the connection element 641 connected to the sub-microphone 131, and thus the direction control actuator 631 functions in a similar manner to the direction control actuator 531 according to the third modification.

Similarly, the direction control actuator 634 controls the sound sensing direction of the sub-microphone 134 and thus the direction control actuator 634 functions in a similar manner to the direction control actuator 534 according to the third modification. Similarly, the direction control actuator corresponding to the sub-microphone 132 controls the sound sensing direction of the sub-microphone 134, and the direction control actuator corresponding to the sub-microphone 133 controls the sound sensing direction of the sub-microphone 133. Thus, the direction control actuators corresponding to respective sub-microphones 132 and 133 function in a similar manner to the direction control actuators according to the third modification.

The unmanned air vehicle 600 according to the present modification is different from the unmanned air vehicle 500 according to the third modification in that instead of the processor 570, a processor 670 is disposed in the housing 140. The processor 670 of the unmanned air vehicle 600 performs an operation basically similar to that performed by the processor 570 of the unmanned air vehicle 500 except for an operation of controlling position control actuators corresponding to respective second microphones 131 to 134.

Note that the above-described actuators that control the slant of the generator 111, the position of the sub-microphone 131, and the sound sensing direction of the sub-microphone 131 and the like and the structural components are merely examples, and the details of the actuators and the structural components are not limited to the examples described above. That is, the control mechanisms are not limited to the examples described above.

Figure 11:
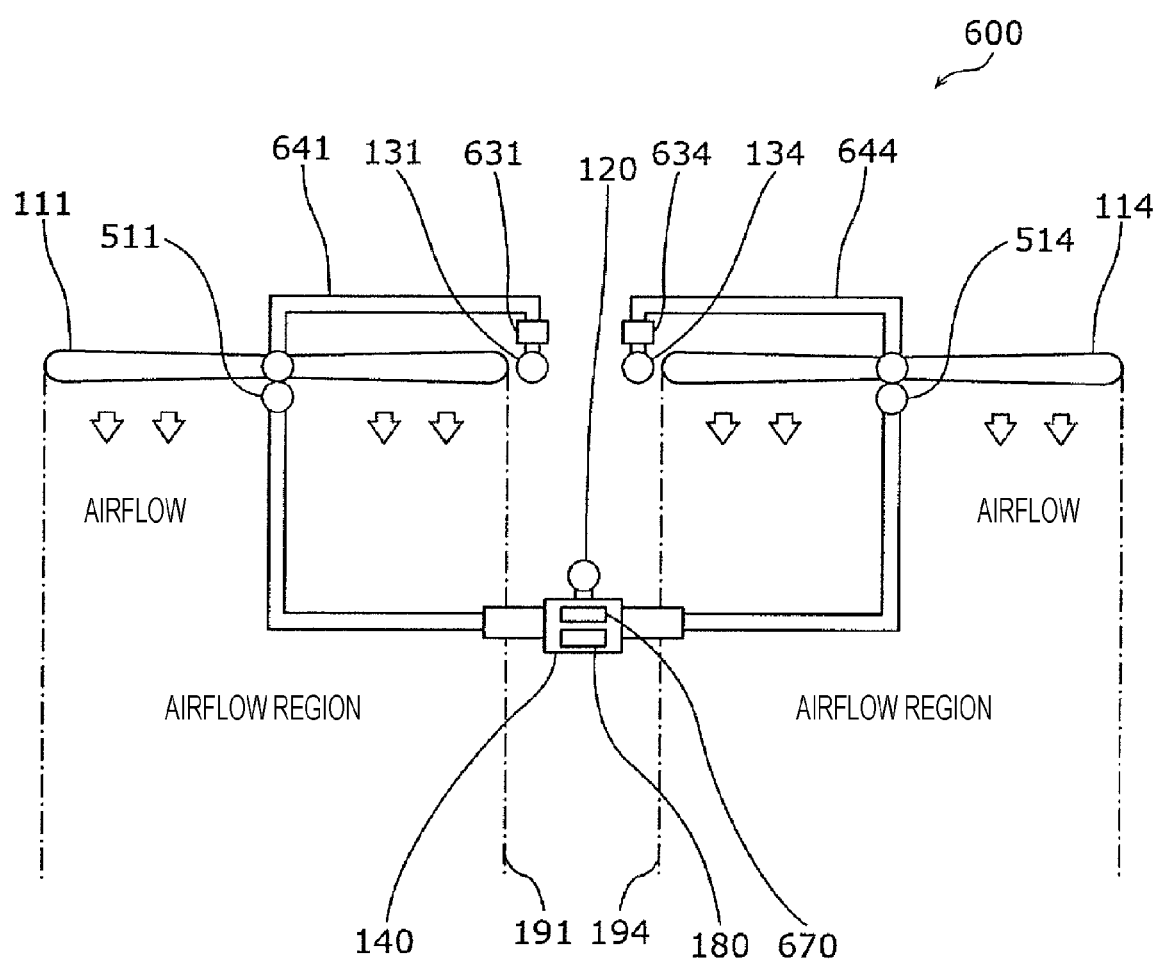
FIG. 11 is a diagram illustrating a state in which the generators according to the fourth modification are not slanted.

FIG. 11 is a diagram illustrating a state in which the generators 111 and 114 shown in FIG. 10 are not slanted.

For example, when the unmanned air vehicle 600 moves, the angle control actuator 511 reduces the slant of the generator 111, and the angle control actuator 514 reduces the slant of the generator 114. Similarly, when the unmanned air vehicle 600 moves, the angle control actuator corresponding to the generator 112 reduces the slant of the generator 112, and the angle control actuator corresponding to the generator 113 reduces the slant of the generator 113.

The changes in the slants of the generators 111 to 114 result in changes in directions of generated airflows. As a result, changes occur in the airflow regions 191 and 194, and a change also occurs in the external region outside the airflow regions 191 and 194.

The change in the slant of the generator 111 results in a change in the position of the connection element 641, which results in a change in the position of the sub-microphone 131. Regardless of these changes, the relative relationship is maintained among the direction of the airflow generated by the generator 111, the position of the generator 111, and the sub-microphone 131. Similarly, the change in the slant of the generator 114 results in a change in the position of the connection element 644, which results in a change in the position of the sub-microphone 134. Regardless of these changes, the relative relationship is maintained among the direction of the airflow generated by the generator 114, the position of the generator 114, and the sub-microphone 134.

Similarly, the change in the slant of the generator 112 results in a change in the position of the connection element corresponding to the generator 112, which results in a change in the position of the sub-microphone 132. Regardless of these changes, the relative relationship is maintained among the direction of the airflow generated by the generator 112, the position of the generator 112, and the sub-microphone 132. Furthermore, the change in the slant of the generator 113 results in a change in the position of the connection element corresponding to the generator 113, which results in a change in the position of the sub-microphone 133. Regardless of these changes, the relative relationship is maintained among the direction of the airflow generated by the generator 113, the position of the generator 113, and the sub-microphone 133.

Thus, the unmanned air vehicle 600 is capable of controlling the positions of the respective sub-microphones 131 to 134 such that the sub-microphones 131 to 134 are located within the external region that changes in response to the changes in the slants of the respective generators 111 to 114, and thus the unmanned air vehicle 600 is capable of suppressing a wind noise from being input to the sub-microphones 131 to 134.

Furthermore, the slants of the generators 111 to 114 and the positions of the sub-microphones 131 to 134 are controlled by the angle control actuators 511 to 514, which makes it possible to simplify the control operation. Furthermore, the maintaining of the relative positions allows a suppression of an influence of the changes in the positions.

Note that the third and fourth modifications may be combined properly. For example, the unmanned air vehicle 600 according to the fourth modification may control the slants of the respective generators 111 to 114 in a similar manner to the unmanned air vehicle 500 according to the third modification. More specifically, the unmanned air vehicle 600 according to the fourth modification may reduce the slants of the respective generators 111 to 114 in a similar manner, in terms of timings, to the unmanned air vehicle 500 according to the third modification. The unmanned air vehicle 600 according to the fourth modification may reduce the slant of one or more generators of the generators 111 to 114.

The unmanned air vehicle 600 according to the fourth modification may change the sound sensing directions of the sub-microphones 131 to 134 in a similar manner to the unmanned air vehicle 500 according to the third modification. For example, the unmanned air vehicle 600, the processor 670, the direction control actuators 631 and 634, and the like may operate in a similar manner to the unmanned air vehicle 500, the processor 570, the direction control actuators 531 and 534, and the like according to the third modification.

Fifth Modification

In a fifth modification described below, an unmanned air vehicle includes, as with the unmanned air vehicle 500 according to the third modification, generators 111 to 114, a main microphone 120, sub-microphones 131 to 134, a housing 140, and the like. Furthermore, the unmanned air vehicle according to the present modification also includes, as with the unmanned air vehicle 500 according to the third modification, angle control actuators respectively corresponding to the generators 111 to 114. In the present modification, unlike the third modification, the sub-microphones 131 to 134 are covered by a structural component (also referred to as a windshield element) that blocks a wind.

Figure 12:
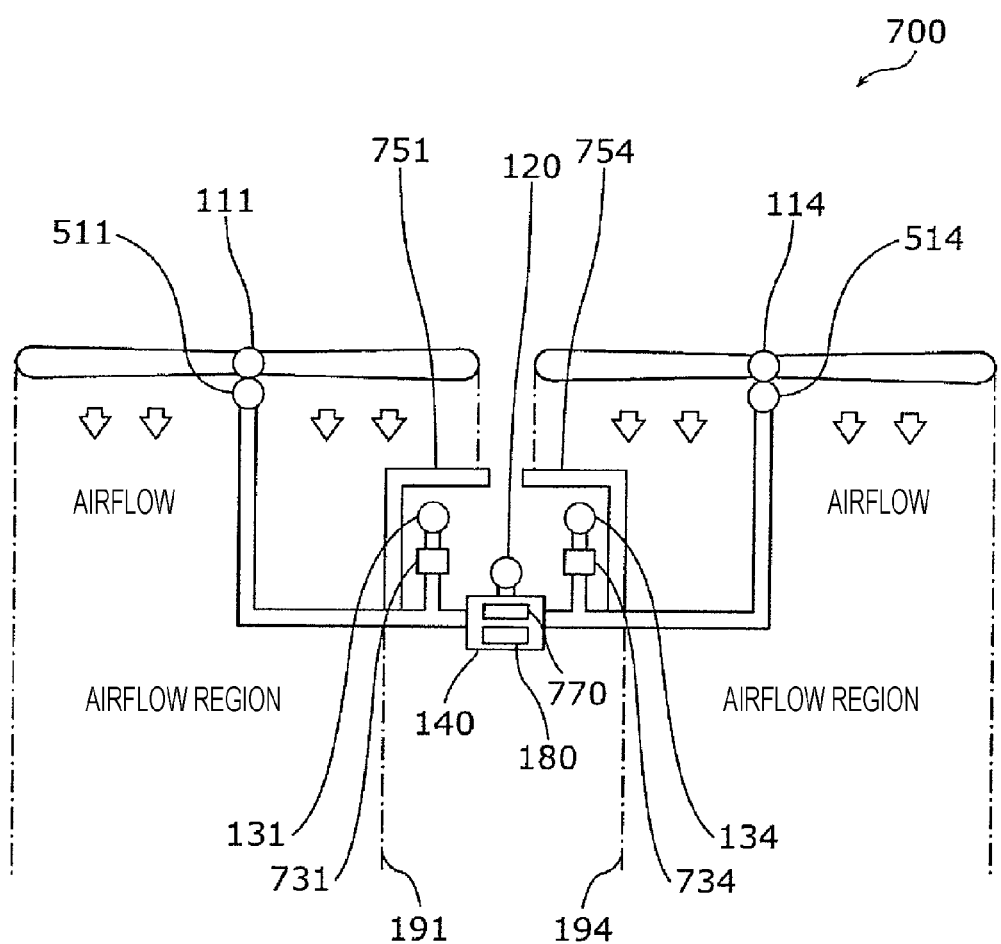
FIG. 12 is a cross-sectional view illustrating a structure of an unmanned air vehicle according to a fifth modification.

FIG. 12 is a cross-sectional view illustrating a structure of the unmanned air vehicle according to the present modification. More specifically, FIG. 12 conceptually illustrates cross sections taken vertically across the generators 111 and 114 of the unmanned air vehicle 700 according to the present modification. Cross sections of the generators 112 and 113 are basically similar to those of the generators 111 and 114 although the cross sections of the generators 112 and 113 are not illustrated.

For example, the unmanned air vehicle 700 according to the present modification is different from the unmanned air vehicle 500 according to the third modification in that the unmanned air vehicle 700 includes windshield elements 751 and 754 and direction control actuators 731 and 734. Furthermore, the unmanned air vehicle 700 also includes windshield elements corresponding to respective sub-microphones 132 and 133 and direction control actuators corresponding to the respective sub-microphones 132 and 133.

That is, the unmanned air vehicle 700 according to the present modification is different from the unmanned air vehicle 500 according to the third modification in that instead of the position control actuators corresponding to the respective sub-microphones 131 to 134, the windshield elements corresponding to the respective sub-microphones 131 to 134 are provided. The unmanned air vehicle 700 is different from the unmanned air vehicle 500 in the mechanisms of direction control actuators corresponding to the respective sub-microphones 131 to 134. Furthermore, unlike the unmanned air vehicle 500 according to the third modification, the generators 111 to 114 are located close to each other.

The windshield element 751 is disposed between the generator 111 and the sub-microphone 131. The size or the position of the windshield element 751 is determined such that at least part of the windshield element 751 is included in an airflow region 191 generated by the generator 111. Furthermore, to suppress a reduction in force, for example, the size or the position of the windshield element 751 is determined such that at least part of the windshield element 751 included in the airflow region 191 is smaller, in a direction perpendicular to the direction of the airflow, than a rotation radius of a rotary wing of the generator 111.

The airflow region 191 described above is an airflow region defined in a case where the windshield element 751 does not exist. Actually, the airflow region 191 is changed by the existence of the windshield element 751. More specifically, the existence of the windshield element 751 causes a downstream part of the airflow below the windshield element 751 not to be included in the airflow region 191.

Similarly, the windshield element 754 is disposed between the generator 114 and the sub-microphone 134. The size or the position of the windshield element 754 is determined such that at least part of the windshield element 754 is included in an airflow region 194 generated by the generator 114. Furthermore, to suppress a reduction in force, for example, the size or the position of the windshield element 754 is determined such that at least part of the windshield element 754 included in the airflow region 194 is smaller, in a direction perpendicular to the direction of the airflow, than a rotation radius of a rotary wing of the generator 114.

The airflow region 194 described above is an airflow region defined in a case where the windshield element 754 does not exist. Actually, the airflow region 194 is changed by the existence of the windshield element 754. More specifically, the existence of the windshield element 754 causes a downstream part of the airflow below the windshield element 754 not to be included in the airflow region 194.

Similarly, the windshield element corresponding to the sub-microphone 132 is disposed so as to correspond to the generator 112 and the sub-microphone 132. Similarly, the windshield element corresponding to the sub-microphone 133 is disposed so as to correspond to the generator 113 and the sub-microphone 133. The sizes and the positions of the windshield elements corresponding to the respective sub-microphones 132 and 133 are also determined in similar manners to those for the windshield elements 751 and 754.

The direction control actuator 731 controls the sound sensing direction of the sub-microphone 131. The direction control actuator 731 controls the sound sensing direction of the sub-microphone 131 by rotating the shaft of the support structure connected to the sub-microphone 131, and thus the direction control actuator 731 functions in a similar manner to the direction control actuator 531 according to the third modification.

Similarly, the direction control actuator 734 controls the sound sensing direction of the sub-microphone 134 and thus the direction control actuator 734 functions in a similar manner to the direction control actuator 534 according to the third modification. Similarly, the direction control actuator corresponding to the sub-microphone 132 controls the sound sensing direction of the sub-microphone 134, and the direction control actuator corresponding to the sub-microphone 133 controls the sound sensing direction of the sub-microphone 133. Thus, the direction control actuators corresponding to respective sub-microphones 132 and 133 function in a similar manner to the direction control actuators according to the third modification.

The unmanned air vehicle 700 according to the present modification is different from the unmanned air vehicle 500 according to the third modification in that instead of the processor 570, a processor 770 is disposed in the housing 140. The processor 670 of the unmanned air vehicle 700 performs an operation basically similar to that performed by the processor 570 of the unmanned air vehicle 500 except for an operation of controlling position control actuators corresponding to respective second microphones 131 to 134.

In the present modification, the sub-microphone 131 is disposed inside the windshield element 751, and the sub-microphone 134 is disposed inside the windshield element 754. Similarly, the sub-microphone 132 is disposed inside the windshield element corresponding to the sub-microphone 132, and the sub-microphone 133 is disposed inside the windshield element corresponding to the sub-microphone 133. This configuration makes it possible for the unmanned air vehicle 700 to suppress a wind noise from being input to the sub-microphones 131 to 134.

Note that the main microphone 120 may also be disposed in the inside of at least one of the plurality of windshield elements corresponding to the sub-microphones 131 to 134. This makes it possible for the unmanned air vehicle 700 to suppress a wind noise from being input to the main microphone 120.

The unmanned air vehicle 700 according to the present modification may not include a direction control actuator and a direction control actuator. In this case, each generator may be firmly disposed, and the sound sensing direction of each sub-microphone may be fixed. The windshield element according to the present modification is not limited to that according to the third modification described above, but the windshield element may be applied to the embodiments described above or the modifications other than the third modification. More specifically, for example, the unmanned air vehicle 100 or the like according to the embodiment may include a windshield element similar to the windshield element disclosed in the present modification.

Each windshield element may be configured to block an airflow that will occur relative to a movement of the unmanned air vehicle 700. This makes it possible to suppress wind noise from being input to each sub-microphone or the like.

The unmanned air vehicle has been described above with reference to various embodiments and modifications. However, the unmanned air vehicle is not limited to those embodiments and modifications. It will be apparent to those skilled in the art that many various modifications may be applicable to the embodiments. Furthermore, constituent elements of embodiments may be arbitrarily combined.

For example, a process executed by a particular constituent element in the embodiments or modifications described above may be executed by another constituent element. The processing order may be changed among a plurality of processes. A plurality of processes may be executed in parallel.

Ordinal numbers such as first, second, and so on used in the explanations may be properly changed. An ordinal number may be newly assigned to a constituent element, or an ordinal number assigned to a particular constituent element may be deleted.

The structural components each may be made of each may be made of a pure substance or a mixture of two or more substances. More specifically, a metal, a resin, a wood, or other materials may be employed. The location of each constituent element may be defined by a location of the center of the constituent element or by a principal location of the constituent element.

The upstream direction corresponds to the direction opposite to the direction of the airflow, and the downstream direction corresponds to the direction of the airflow. For example, in a case where the direction of the airflow is downward, the upstream direction is upward, and the downstream direction is downward.

In the embodiments described above, it is assumed by way of example that the unmanned air vehicle includes the memory and the processor stores signals in the memory. However, the unmanned air vehicle may not include the memory. In this case, the processor may perform a transmission process to transmit a signal to an external apparatus via an antenna, and the external apparatus may perform signal processing. That is, the processes performed by the processor may be any of the storage process, the signal processing, and the communication process.

A basic configuration of an unmanned air vehicle according to an aspect of the present disclosure, and typical modifications are described below. These may be combined or may be combined with some of the embodiments and the modifications described above.

(1) In an aspect of the present disclosure, an unmanned air vehicle (100, 200, 400, 500, 600, 700) includes one or more generators (111 to 114, 210), one or more first microphones (120, 221, 222), one or more second microphones (131 to 134, 231, 232), and a processor (170, 270, 570, 670, 770).

The one or more generators (111 to 114, 210) each generate a force that drives the unmanned air vehicle to fly and generate an airflow. The one or more first microphones (120, 221, 222) are located in an external region that is not included in any of one or more first airflow regions each of which is a region of an airflow generated by corresponding one of the one or more generators.

The one or more second microphones (131 to 134, 231, 232), are located in the external region between at least one of the one or more generators and the one or more first microphones. The processor (170, 270, 570, 670, 770) performs processing on one or more first signals output from the one or more first microphones, and one or more second signals output from the one or more second microphones.

Thus, the unmanned air vehicle (100, 200, 400, 500, 600, 700) is capable of suppressing a wind noise from being input to the one or more first microphones for sensing an ambient sound around the unmanned air vehicle, and the one or more second microphones for sensing noise. The unmanned air vehicle (100, 200, 400, 500, 600, 700) is capable of properly sensing noise, which may be generated by a generator and which may be input to the first microphone, by using the second microphone located between the first microphone and the generator.

(2) For example, in the unmanned air vehicle (100, 400, 500, 600, 700), the one or more generators (111 to 114) may be two or more generators. The one or more second microphones (131 to 134) may be two or more second microphones. Each of the second microphones (131 to 134) may be located, in the external region, between at least one first microphone and the generator corresponding to one of the second microphones.

By employing the configuration described above, it becomes possible for the unmanned air vehicle (100, 400, 500, 600, 700) to generate a force that drives the unmanned air vehicle to fly by using the plurality of generators. The unmanned air vehicle (100, 400, 500, 600, 700) may include a second microphone for sensing noise generated by each generator. Thus, the unmanned air vehicle (100, 400, 500, 600, 700) is capable of properly sensing noise associated with each generator.

(3) For example, in the unmanned air vehicle (100, 400, 500, 600, 700), the one or more first microphones (120) is one first microphone. Each of the second microphones (131 to 134) may be located, in the external region, between one first microphone and the generator corresponding to one of the second microphones. In this configuration, the unmanned air vehicle (100, 400, 500, 600, 700) is capable of properly sensing noise which may be generated by a generator and which may be input to one first microphone.

(4) For example, in the unmanned air vehicle (400, 500, 600, 700), directions of the airflows generated by the respective two or more generators (111 to 114) are not parallel to each other and do not cross each other.

The configuration described above makes it possible for the unmanned air vehicle (400, 500, 600, 700) to have a sufficiently large region in which the first microphone and the second microphones are disposed. Thus, it is possible to dispose the first microphone (120) and the second microphones (131 to 134) at proper locations.

(5) For example, in the unmanned air vehicle (400, 500, 600, 700), the directions of the airflows generated by the respective two or more generators (111 to 114) are directions that allow the unmanned air vehicle to fly. This makes it possible for the unmanned air vehicle (400, 500, 600, 700) to properly fly in a state in which the generators are slanted.

(6) For example, the unmanned air vehicle (500, 600, 700) may include first actuators (511, 514) that control the directions of the airflows generated by the respective two or more generators. Thus, it is possible for the unmanned air vehicle (500, 600, 700) to control the slants the generators thereby controlling the directions of the airflows generated by the generators. That is, the unmanned air vehicle (500, 600, 700) is capable of adaptively changing the slants of the generators.

(7) For example, in the unmanned air vehicle (500, 600, 700), the processor (570, 670, 770) may make a judgment as to the movement of the unmanned air vehicle. The processor (570, 670, 770) may control the first actuators to operate so as to reduce an angle between the respective directions of the airflows generated by the two or more generators when the unmanned air vehicle moves. This makes it possible for the unmanned air vehicle (500, 600, 700) to suppress a force from occurring in a direction opposite to the moving direction.

(8) For example, in the unmanned air vehicle (500, 600, 700), the two or more second microphones (131 to 134) may be located in the external region regardless of a change in the direction of the airflow generated by each one of the two or more generators. This makes it possible for the unmanned air vehicle (500, 600, 700) to suppress the wind noise from being input to the second microphone regardless of whether a change occurs in the direction of the airflow.

(9) For example, the unmanned air vehicle (500) may include second actuators (521, 524) that control the positions of the respective two or more second microphones. The processor (570) may control the second actuators to operate such that in a case where a change occurs in the direction of the airflow generated by each of the two or more generators, the two or more second microphones are each located in the external region. Thus, the unmanned air vehicle (500) is capable of positioning the second microphones properly in response to the change in the slant of the generators.

(10) For example, in the unmanned air vehicle (500, 600, 700) in a case where a change occurs in the direction of the airflow generated by each of the two or more generators, a relative relationship may be maintained between the first airflow region of each of the two or more generators and the position of each second microphone corresponding to one of the generators. This makes it possible for the unmanned air vehicle (500, 600, 700) to maintain each second microphone in a proper position adaptively depending on a change in the slant of each generator.

(11) For example, in the unmanned air vehicle (500, 600, 700), the processor (570, 670, 770) may control the first actuators to operate such that during a period in which sound sensing by the one or more first microphone is not performed, the first actuators reduce an angle between the directions of the airflows generated by the respective two or more generators.

This makes it possible for the unmanned air vehicle (500, 600, 700) to slant the generators during the sound sensing period so as to achieve a state that allows it to properly sense the sound. During the period other than the sound sensing period, the unmanned air vehicle (500, 600, 700) is capable of achieving a state that allows it to properly move.

(12) For example, the unmanned air vehicle (500, 600, 700) may include third actuators (531, 534, 631, 634, 731, 734) that control the sound sensing directions of the respective one or more second microphones. The processor (570, 670, 770) may make a judgment as to the movement of the unmanned air vehicle, and may control the third actuator to operate such that the sound sensing direction of the at least one of the one or more second microphones changes according to a change in the moving direction.

This makes it possible for the unmanned air vehicle (500, 600, 700) to change the sound sensing direction adaptively depending on a change in the moving direction.

(13) For example, in the unmanned air vehicle (500, 600, 700), the processor (570, 670, 770) may control the third actuator to operate such that the sound sensing direction of the at least one of the one or more second microphones is different from the moving direction. This makes it possible for the unmanned air vehicle (500, 600, 700) to suppress wind noise, which may occur due to a relative movement of the unmanned air vehicle, from being input to each second microphone.

(14) For example, in the unmanned air vehicle (100, 200, 400, 500, 600, 700), the processor (170, 270, 570, 670, 770) may generate one or more third signals indicating one or more sounds according to the one or more first signals and the one or more second signals. This makes it possible for the unmanned air vehicle (100, 200, 400, 500, 600, 700) to newly generate a signal indicating a sound according to the signal sensed by the first microphone located relatively far apart from the generator and the signal sensed by the second microphone located relative close to the generator.

(15) For example, in the unmanned air vehicle (100, 200, 400, 500, 600, 700), the processor (170, 270, 570, 670, 770) may generate the one or more third signals each of which indicates a sound resulting from suppressing the sound indicated by at least one of the one or more second signals from the sound indicated by at least one of the one or more first signal.

This makes it possible for the unmanned air vehicle (100, 200, 400, 500, 600, 700) to newly generate a signal indicating a sound resulting from removing a sound indicated by the signal sensed by the second microphone located relatively close to the generator from a sound indicated by the signal sensed by the first microphone located relatively far apart from the generator.

(16) For example, in the unmanned air vehicle (100, 200, 400, 500, 600, 700), the external region is a region that is not included in any of the one or more first airflow regions and that is not included in any of the one or more second airflow regions. Note that each of the one or more second airflow regions is a region of an airflow flowing toward the one of the one or more generators.

This makes it possible for the unmanned air vehicle (100, 200, 400, 500, 600, 700) to suppress an airflow flowing toward the generator from hitting the first microphone and the second microphone. Thus, the unmanned air vehicle (100, 200, 400, 500, 600, 700) is capable of further suppressing wind noise from being input to the first microphone and the second microphone.

(17) For example, in the unmanned air vehicle (100, 200, 400, 500, 600, 700), the one or more generators (111 to 114, 210) each may include one or more rotary wings. This makes it possible for the unmanned air vehicle (100, 200, 400, 500, 600, 700) to suppress an airflow generated by a rotary wing from hitting the first microphone and the second microphone. Furthermore, the unmanned air vehicle (100, 200, 400, 500, 600, 700) is capable of properly sensing noise generated by the rotary wing.

The present disclosure is applicable to an unmanned air vehicle that senses a sound and a sound/voice recording system or the like that senses a sound using an unmanned air vehicle.

What is claimed is:

1. An unmanned air vehicle, comprising:
   one or more generators, each of which generates a force that drives the unmanned air vehicle to fly and also generates an airflow;
   one or more first microphones, each of which is located in an external region that is not included in any of one or more first airflow regions, each of the one or more first airflow regions corresponding to the airflow generated by one of the one or more generators;
   one or more second microphones, each of which is located in the external region between at least one of the one or more generators and the one or more first microphones;
   an actuator that controls a sound detecting direction of each of the one or more second microphones; and
   a processor that performs processing on one or more first signals output from the one or more first microphones and one or more second signals output from the one or more second microphones,
   wherein the processor determines a moving direction of the unmanned air vehicle, and
   the processor controls operation of the actuator such that the sound detecting direction of at least one of the one or more second microphones changes according to a change in the moving direction.

2. The unmanned air vehicle according to claim 1, wherein
   the one or more generators include two or more generators,
   the one or more second microphones include two or more second microphones, and
   each of the two or more second microphones is located, in the external region, between at least one of the one or more first microphones and one of the two or more generators, each of the two or more generators corresponding to one of the two or more second microphones.

3. The unmanned air vehicle according to claim 2, wherein
   the one or more first microphones include one first microphone, and
   each of the two or more second microphones is located, in the external region, between the one first microphone and one of the two or more generators.

4. The unmanned air vehicle according to claim 2, wherein directions of airflows generated by the two or more generators are not parallel and do not cross.

5. The unmanned air vehicle according to claim 4, wherein the directions of the airflows generated by the two or more generators allow the unmanned air vehicle to fly.

6. The unmanned air vehicle according to claim 4, further comprising:
   second actuators that control the directions of the airflows generated by the two or more generators.

7. The unmanned air vehicle according to claim 6, wherein
   the processor determines a movement of the unmanned air vehicle, and
   the processor controls operation of the first second actuators such that an angle between the directions of the airflows generated by the two or more generators when the unmanned air vehicle moves is reduced.

8. The unmanned air vehicle according to claim 7, wherein the processor controls operation of the second actuators such that, during a period in which sound detecting by the one or more first microphone is not performed, an angle between the directions of the airflows generated by the two or more generators is reduced.

9. The unmanned air vehicle according to claim 6, wherein the two or more second microphones are located in the external region regardless of a change in the directions of the airflows generated by the two or more generators.

10. The unmanned air vehicle according to claim 6, further comprising:
    third actuators that control respective positions of the two or more second microphones, wherein
    the processor controls operation of the third actuators such that, in a case where a change occurs in the directions of the airflows generated by the two or more generators, the two or more second microphones are each located in the external region.

11. The unmanned air vehicle according to claim 10, wherein, in a case where a change occurs in the directions of the airflows generated by the two or more generators, a relative relationship is maintained between the first airflow region of each of the two or more generators and a position of each of the two or more second microphones.

12. The unmanned air vehicle according to claim 1, wherein the processor controls operation of the actuator such that the sound detecting direction of the at least one of the one or more second microphones is different from the moving direction.

13. The unmanned air vehicle according to claim 1, wherein the processor generates one or more third signals indicating one or more sounds according to the one or more first signals and the one or more second signals.

14. The unmanned air vehicle according to claim 13, wherein each of the one or more third signals indicates a sound resulting from suppressing sound indicated by at least one of the one or more second signals from sound indicated by at least one of the one or more first signals.

15. The unmanned air vehicle according to claim 1, wherein the external region is not included in any of the one or more first airflow regions and is not included in any of one or more second airflow regions, the one or more second airflow regions respectively flowing into the one or more generators.

16. The unmanned air vehicle according to claim 1, wherein each of the one or more generators includes one or more rotary wings.

17. An unmanned air vehicle, comprising:
    two or more generators, each of which generates a force that drives the unmanned air vehicle to fly and also generates an airflow;
    first actuators that control the directions of airflows generated by the two or more generators;

one or more first microphones, each of which is located in an external region that is not included in any of two or more first airflow regions, each of the two or more first airflow regions corresponding to the airflow generated by one of the two or more generators;

two or more second microphones, each of which is located in the external region between at least one of the two or more generators and the one or more first microphones, each of the two or more generators corresponding to one of the two or more second microphones;

second actuators that control respective positions of the two or more second microphones; and a processor that performs processing on one or more first signals output from the one or more first microphones and two or more second signals output from the two or more second microphones, wherein directions of the airflows generated by the two or more generators are not parallel and do not cross, and the processor controls operation of the second actuators such that, in a case where a change occurs in the directions of the airflows generated by the two or more generators, the two or more second microphones are each located in the external region.

18. An unmanned air vehicle, comprising:

two or more generators, each of which generates a force that drives the unmanned air vehicle to fly and also generates an airflow;

actuators that control the directions of airflows generated by the two or more generators;

one or more first microphones, each of which is located in an external region that is not included in any of two or more first airflow regions, each of the two or more first airflow regions corresponding to the airflow generated by one of the two or more generators;

two or more second microphones, each of which is located in the external region between at least one of the two or more generators and the one or more first microphones, each of the two or more generators corresponding to one of the two or more second microphones; and a processor that performs processing on one or more first signals output from the one or more first microphones and two or more second signals output from the two or more second microphones, wherein directions of the airflows generated by the two or more generators are not parallel and do not cross, the processor determines a movement of the unmanned air vehicle, the processor controls operation of the actuators such that an angle between the directions of the airflows generated by the two or more generators when the unmanned air vehicle moves is reduced, and the processor controls operation of the actuators such that, during a period in which sound detecting by the one or more first microphone is not performed, an angle between the directions of the airflows generated by the two or more generators is reduced.

* * * * *